US012593144B2

(12) United States Patent
Hanzawa et al.

(10) Patent No.: US 12,593,144 B2
(45) Date of Patent: Mar. 31, 2026

(54) SOLID STATE IMAGING ELEMENT, IMAGING DEVICE, AND SOLID STATE IMAGING ELEMENT CONTROL METHOD

(71) Applicant: SONY SEMICONDUCTOR SOLUTIONS CORPORATION, Kanagawa (JP)

(72) Inventors: Katsuhiko Hanzawa, Kanagawa (JP); Kohei Matsuda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 147 days.

(21) Appl. No.: 18/576,489

(22) PCT Filed: Jan. 31, 2022

(86) PCT No.: PCT/JP2022/003503
§ 371 (c)(1),
(2) Date: Jan. 4, 2024

(87) PCT Pub. No.: WO2023/286297
PCT Pub. Date: Jan. 19, 2023

(65) Prior Publication Data
US 2024/0314458 A1    Sep. 19, 2024

(30) Foreign Application Priority Data
Jul. 16, 2021    (JP) .................................. 2021-117505

(51) Int. Cl.
*H04N 25/445*        (2023.01)
*H04N 23/11*          (2023.01)
(Continued)

(52) U.S. Cl.
CPC ........... *H04N 25/445* (2023.01); *H04N 23/11* (2023.01); *H04N 23/61* (2023.01); *H04N 25/44* (2023.01); *H04N 25/77* (2023.01)

(58) Field of Classification Search
CPC ............................. H04N 25/44; H04N 25/445
See application file for complete search history.

(56) References Cited

U.S. PATENT DOCUMENTS

2006/0013485 A1 *  1/2006  Nitta .................... H04N 25/708
                                                              382/194
2006/0262974 A1 *  11/2006  Watanabe ............ H04N 25/443
                                                              382/167
(Continued)

FOREIGN PATENT DOCUMENTS

JP          H11-225289          8/1999
JP          2006-020037          1/2006
(Continued)

OTHER PUBLICATIONS

JPO, JP 2006-020037 A1 Machine Translation (Year: 2006).*
(Continued)

*Primary Examiner* — David N Werner
(74) *Attorney, Agent, or Firm* — SHERIDAN ROSS P.C.

(57) ABSTRACT

In a solid state imaging element in which signal processing is performed on a pair of pixel signals, the circuit scale thereof is reduced. The solid state imaging element includes a pixel array section, a vertical scanning circuit, and a signal processing circuit. A plurality of pixels are arranged in directions of rows and directions of columns on the pixel array section. The vertical scanning circuit selects, from among the plurality of pixels, a pair of pixels disposed on both ends of a predetermined line segment, which does not match any of the rows and columns and forms an angle of not 45 degrees with respect to the rows, and causes the selected pixels to simultaneously output of a pair of pixel signals. The signal processing circuit performs predetermined signal processing on the pair of pixel signals.

20 Claims, 37 Drawing Sheets

(51) Int. Cl.
    *H04N 23/61*         (2023.01)
    *H04N 25/44*         (2023.01)
    *H04N 25/77*         (2023.01)

(56)          References Cited

U.S. PATENT DOCUMENTS

2010/0277628 A1 * 11/2010 Sawada ................ H04N 25/447
                                   348/E5.091
2014/0307123 A1 * 10/2014 Kurahashi ............ H04N 25/445
                                   348/224.1
2014/0320710 A1 * 10/2014 Tanaka ................ H04N 25/134
                                   348/280
2015/0103216 A1 * 4/2015 Kurahashi ............ H04N 25/445
                                   348/280
2015/0109524 A1 * 4/2015 Laroia ................ H04N 23/6812
                                   348/369
2016/0198115 A1 * 7/2016 Tsuchiya ............... H10F 39/803
                                   348/294
2019/0182419 A1 * 6/2019 Sekiguchi .............. G03B 13/36
2020/0322549 A1 * 10/2020 Lin ...................... H04N 25/704
2021/0074241 A1 * 3/2021 Mostafalu .............. H10D 99/00
2021/0211591 A1 * 7/2021 Kainuma .............. H04N 25/78
2023/0061593 A1 * 3/2023 Nishio .................... H04N 5/77

FOREIGN PATENT DOCUMENTS

JP         2006-033452       2/2006
JP         2020-039113       3/2020
WO    WO-2020045278 A1 *  3/2020  .......... H04N 25/778

OTHER PUBLICATIONS

English Translation of International Search Report prepared by the Japan Patent Office on Mar. 17, 2022, for International Application No. PCT/JP2022/003503, 2 pgs.

\* cited by examiner

F I G . 4
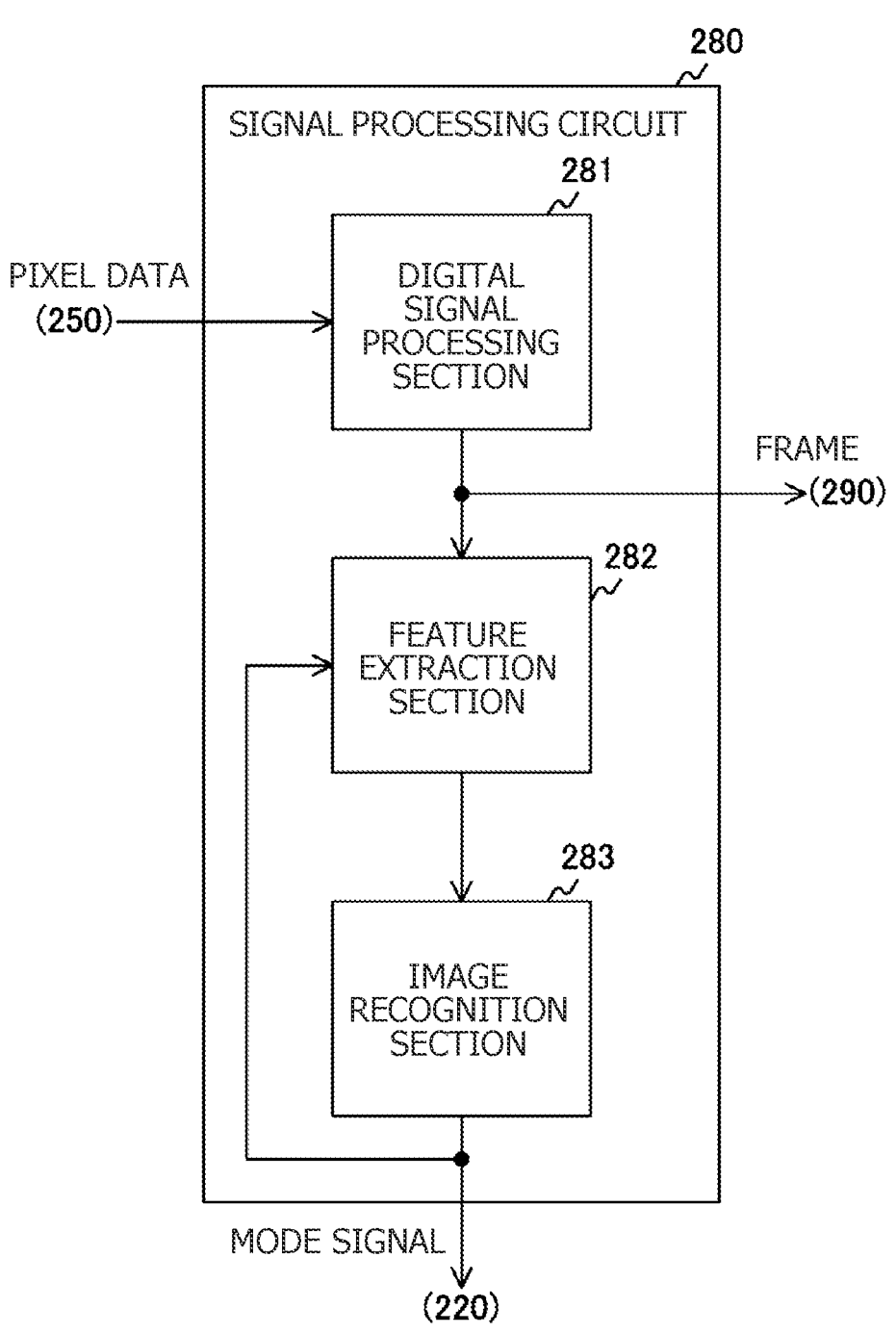

FIG.5
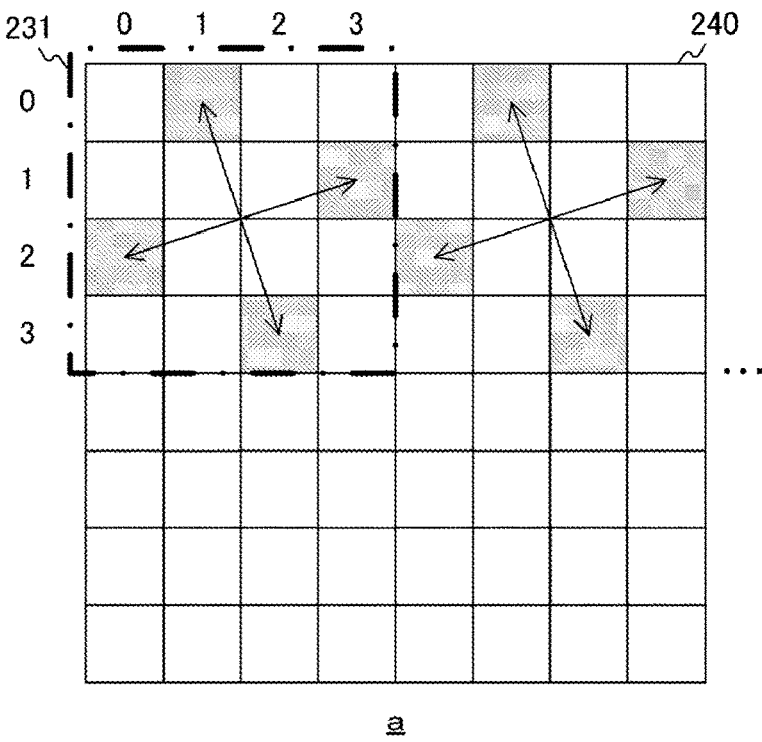
a
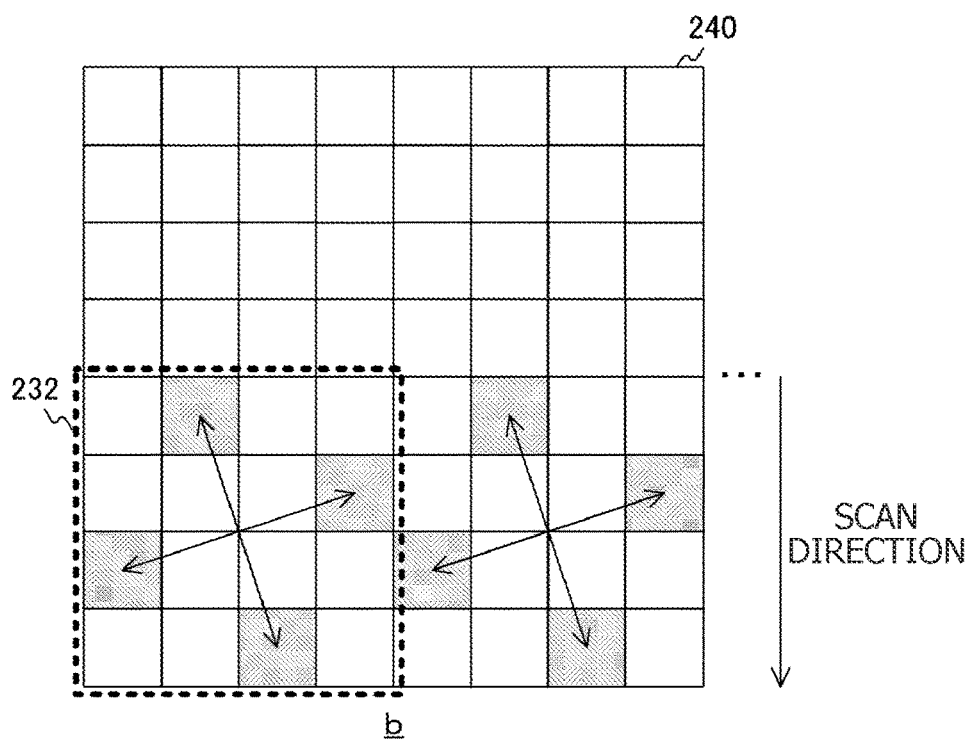
b
SCAN
DIRECTION

FIG.8
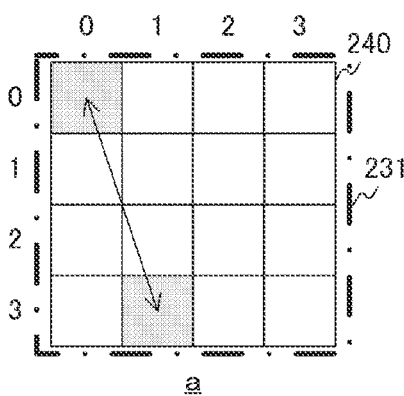
a
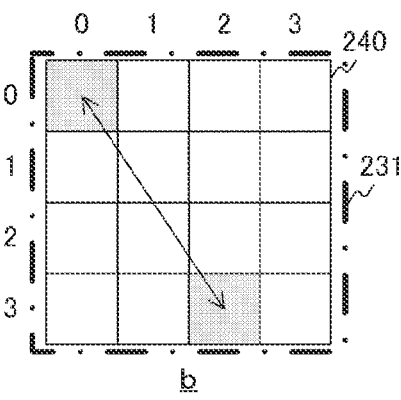
b
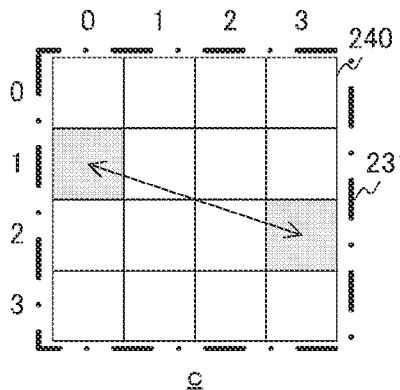
c

FIG.9
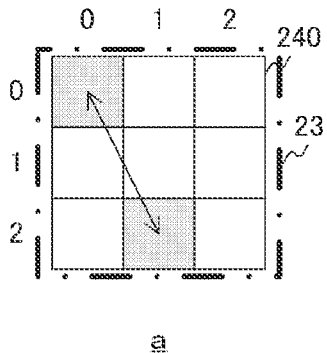
a
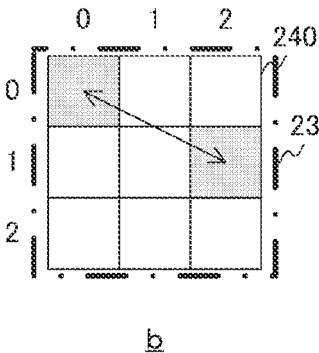
b

FIG.12
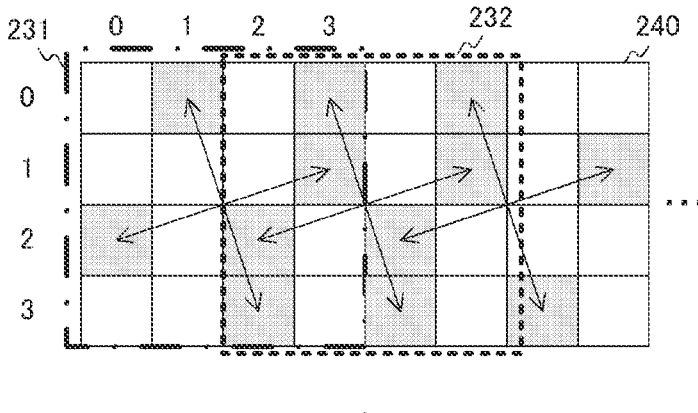
a
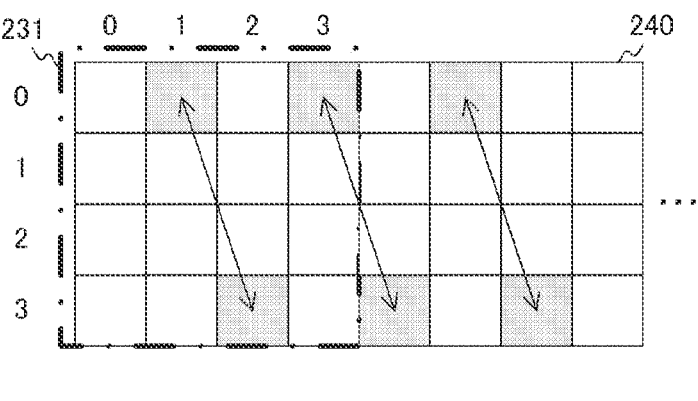
b
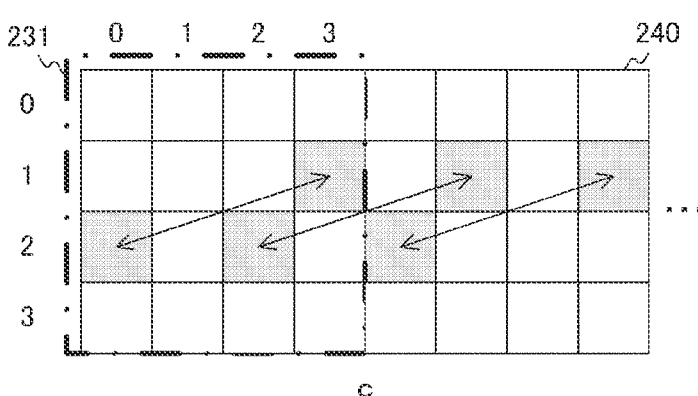
c

FIG.14
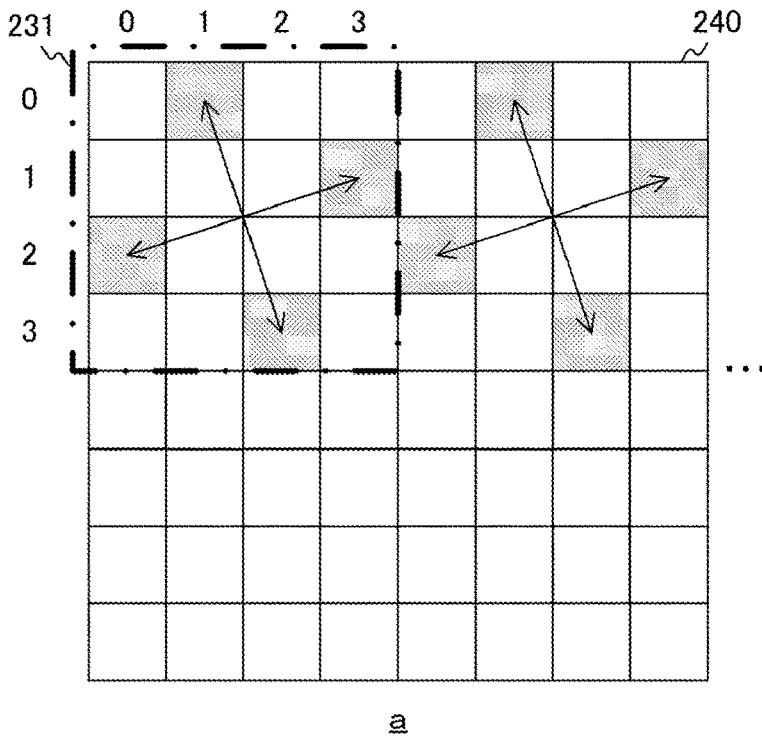
a
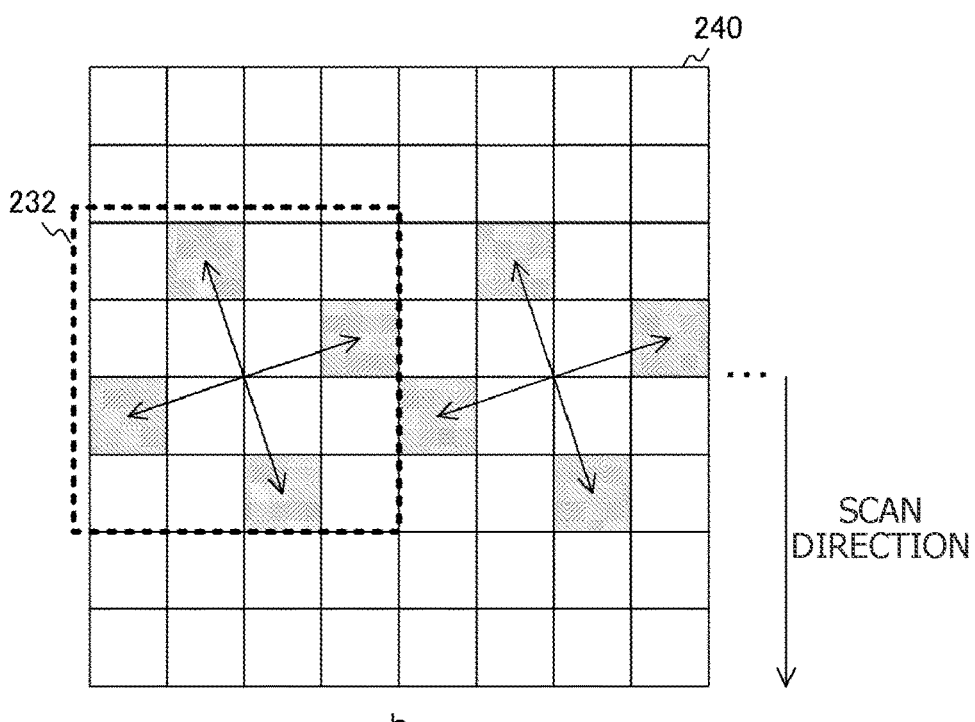
b

FIG.16
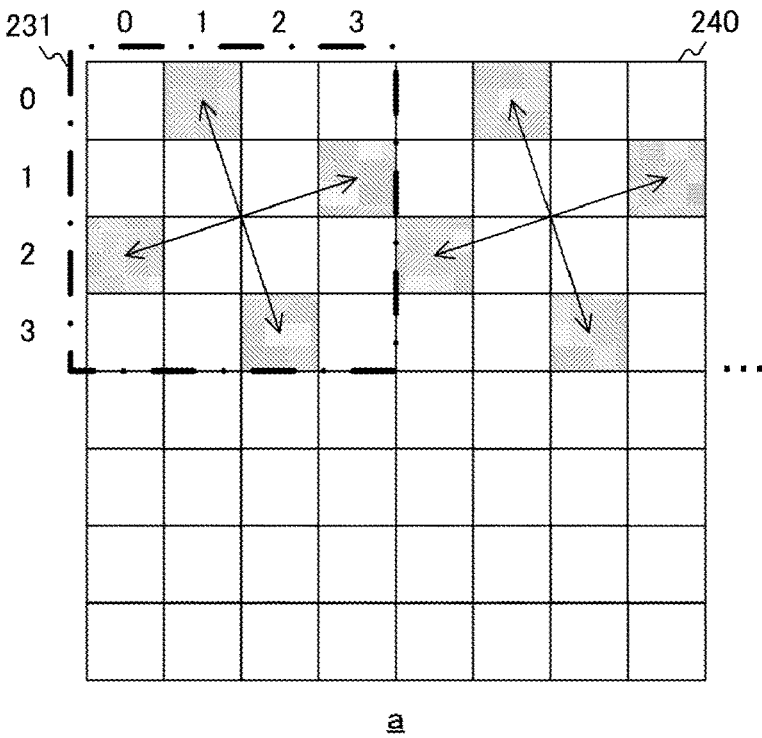
a
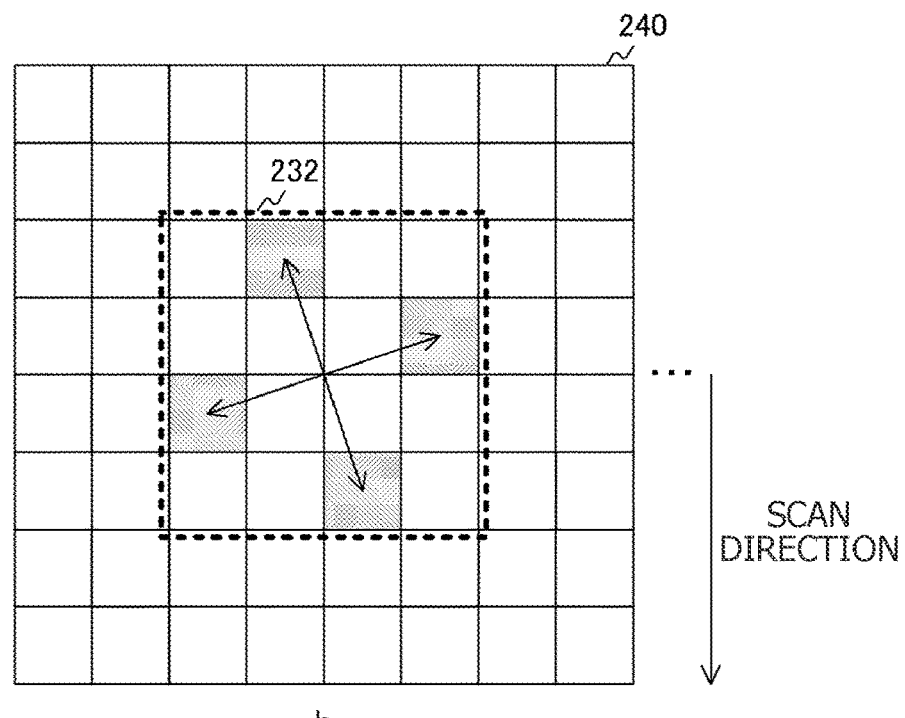
b
SCAN
DIRECTION

FIG.18
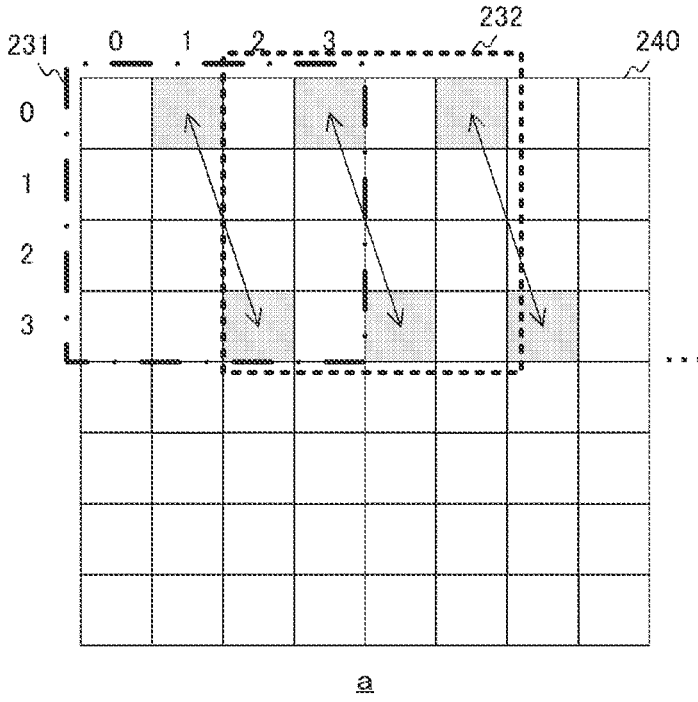
a
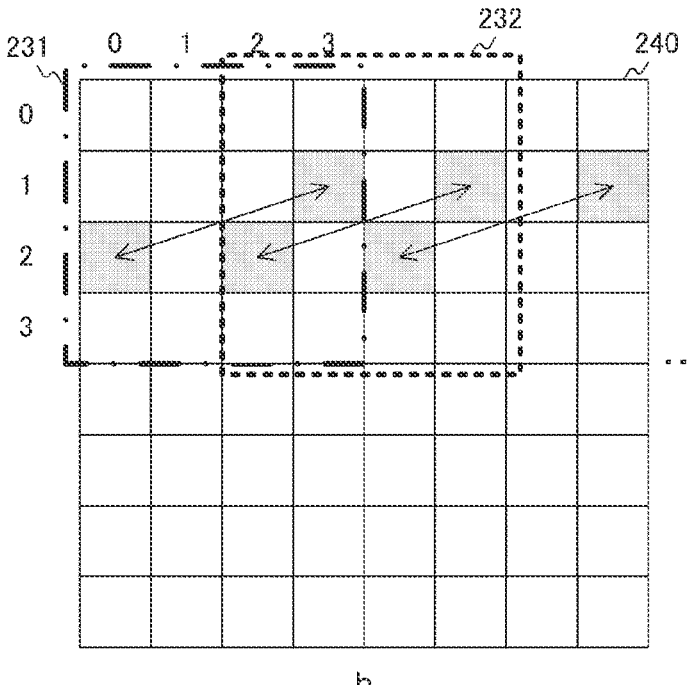
b

FIG.19
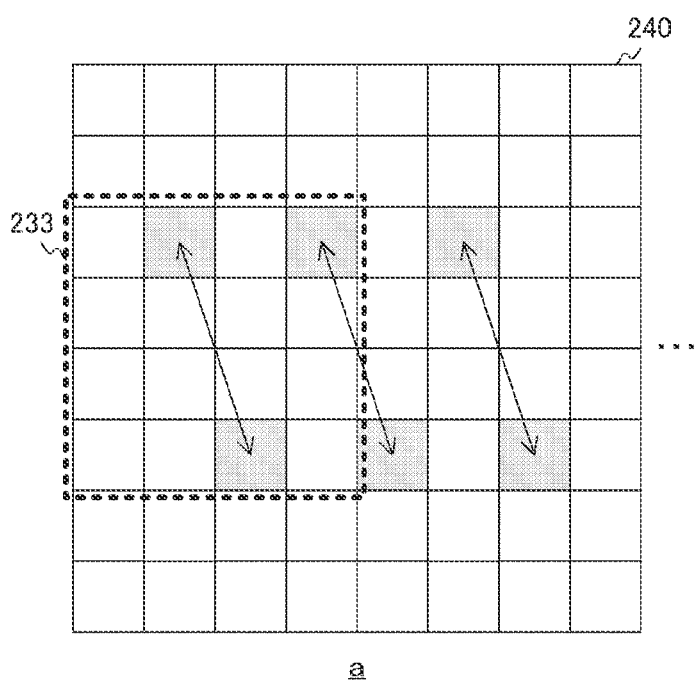
a
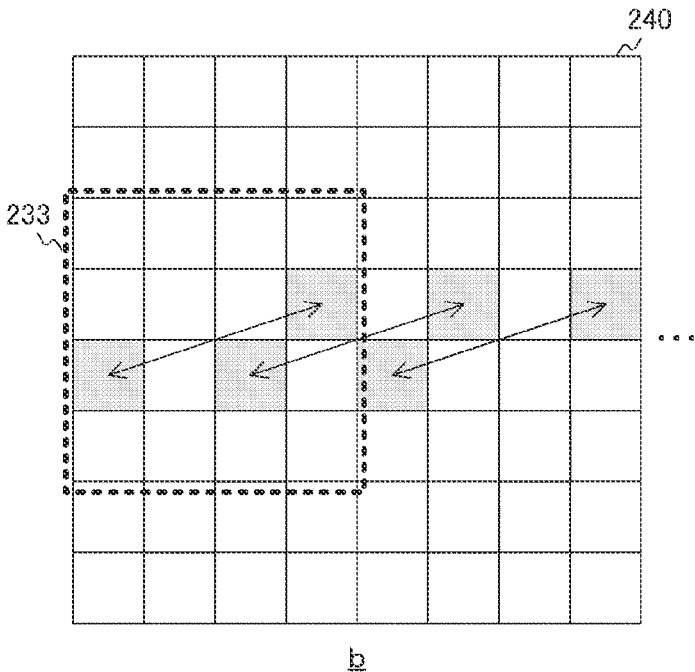
b

FIG.20
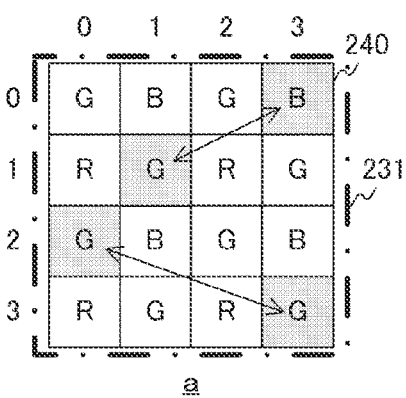
a
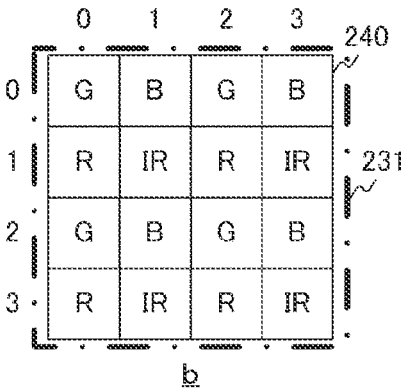
b
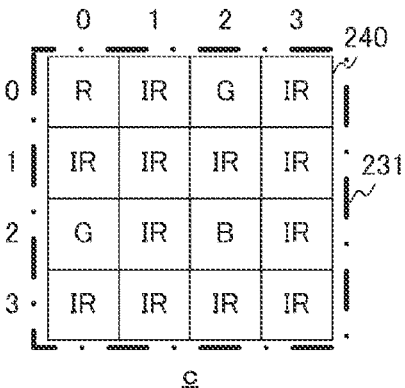
c
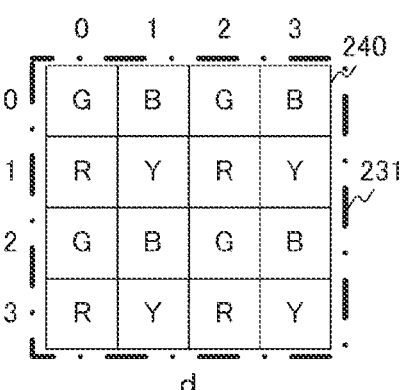
d

FIG.21
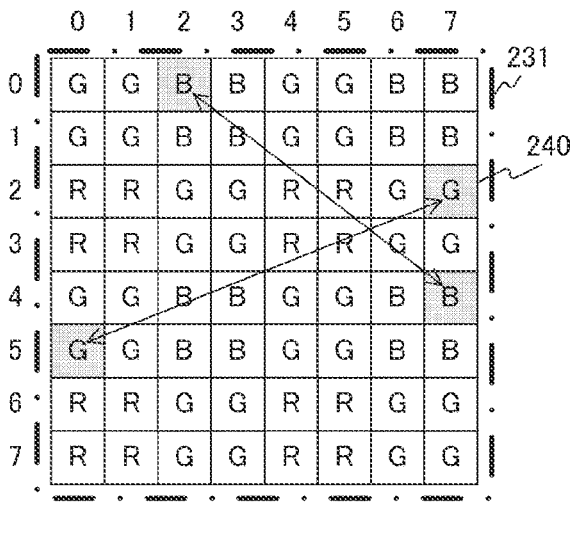
a
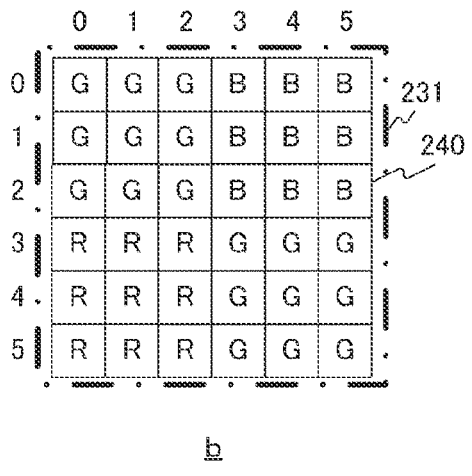
b
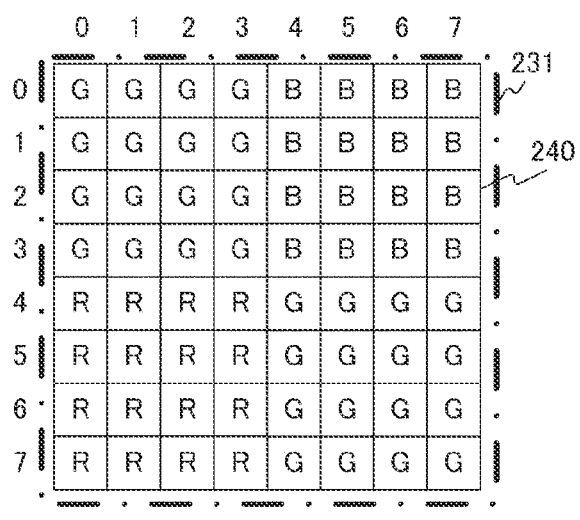
c

FIG.22
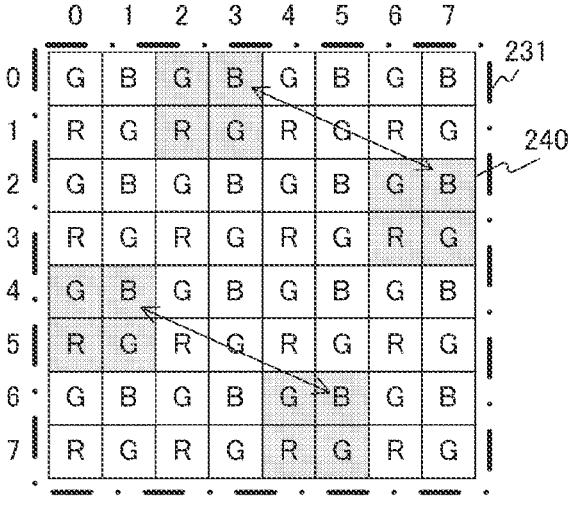
a
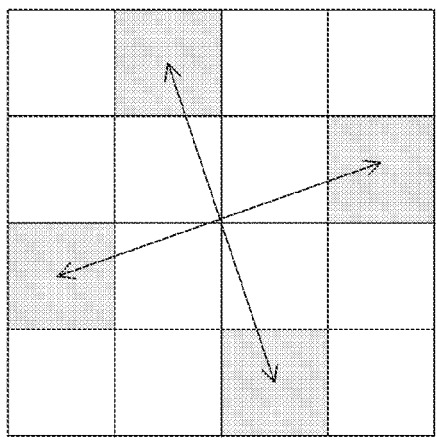
b

FIG.31

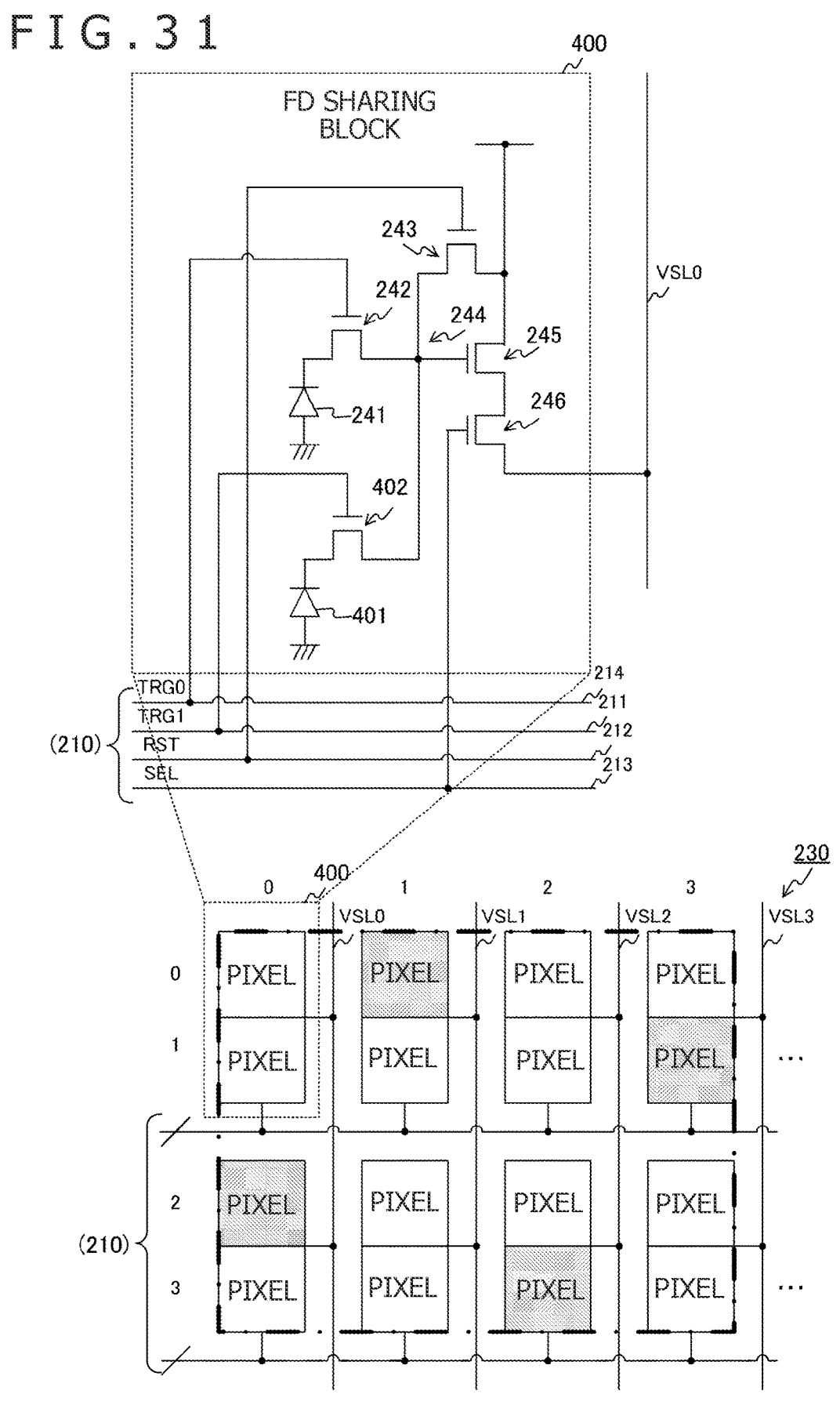

FD SHARING
BLOCK

400

VSL0

243

242

244

245

246

241

402

401

214

TRG0          211
TRG1          212
RST
SEL           213

(210)

400

0          1          2          3

230

VSL0        VSL1        VSL2        VSL3

| | 0 | PIXEL | PIXEL | PIXEL | PIXEL |
| | 1 | PIXEL | PIXEL | PIXEL | PIXEL |

(210)

| | 2 | PIXEL | PIXEL | PIXEL | PIXEL |
| | 3 | PIXEL | PIXEL | PIXEL | PIXEL |

FIG.34
501
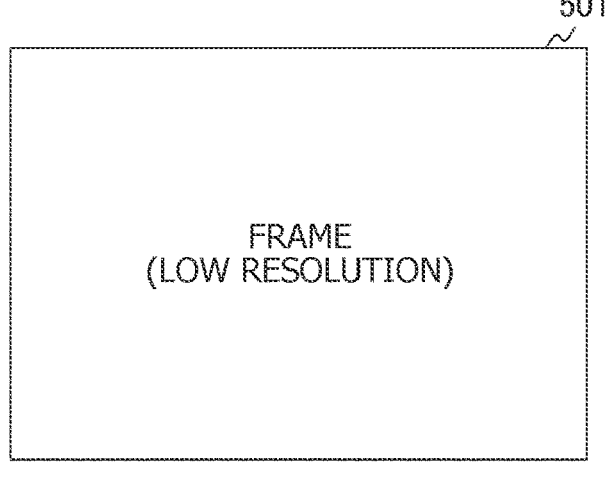
a
502
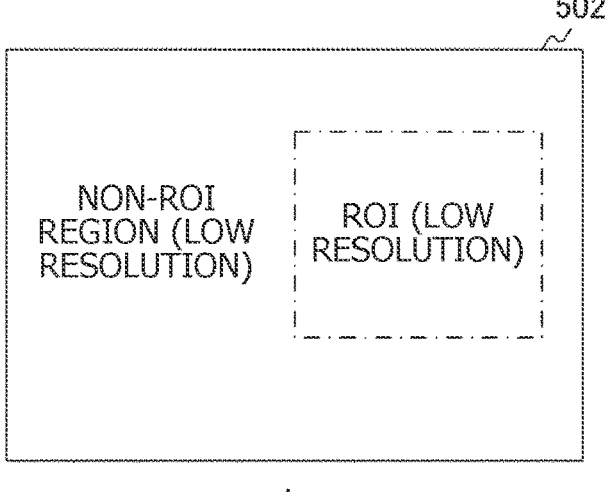
b
503
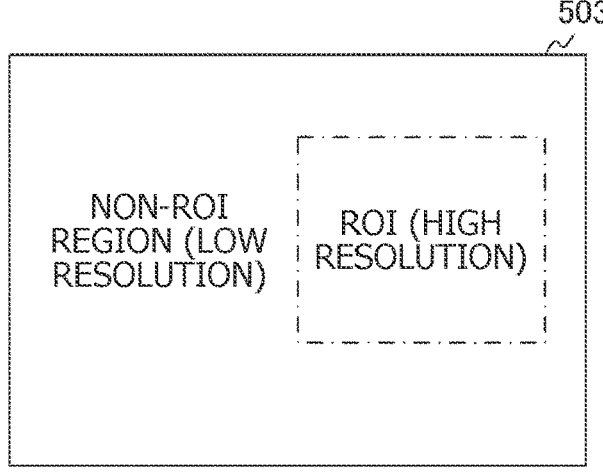
c

FIG.35
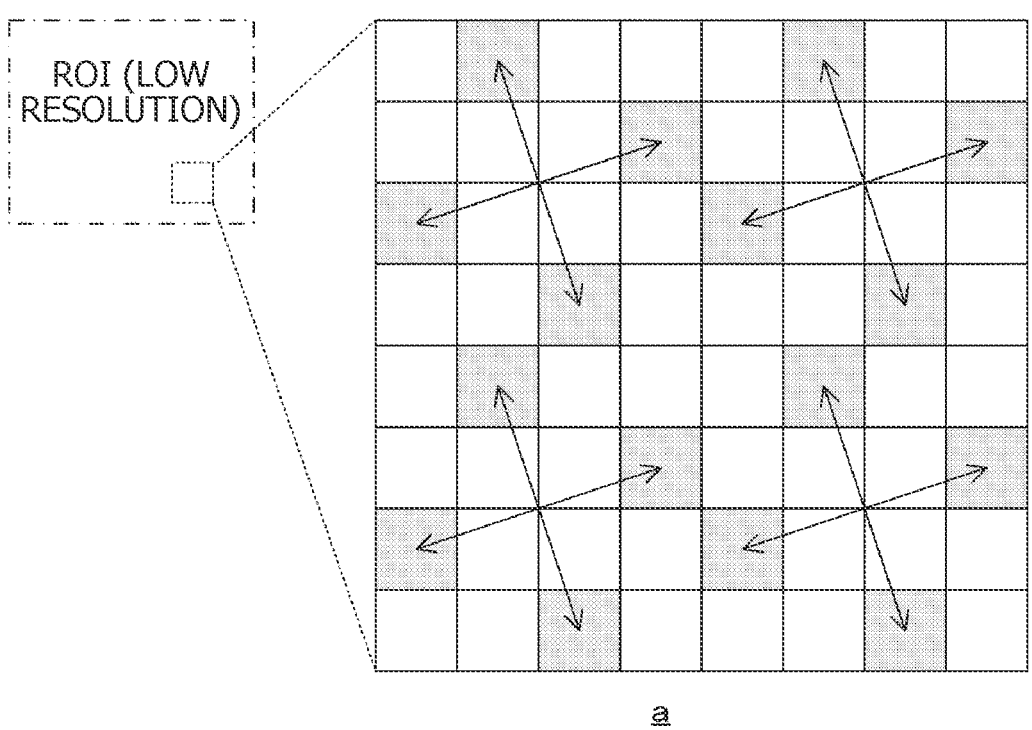
ROI (LOW RESOLUTION)
a
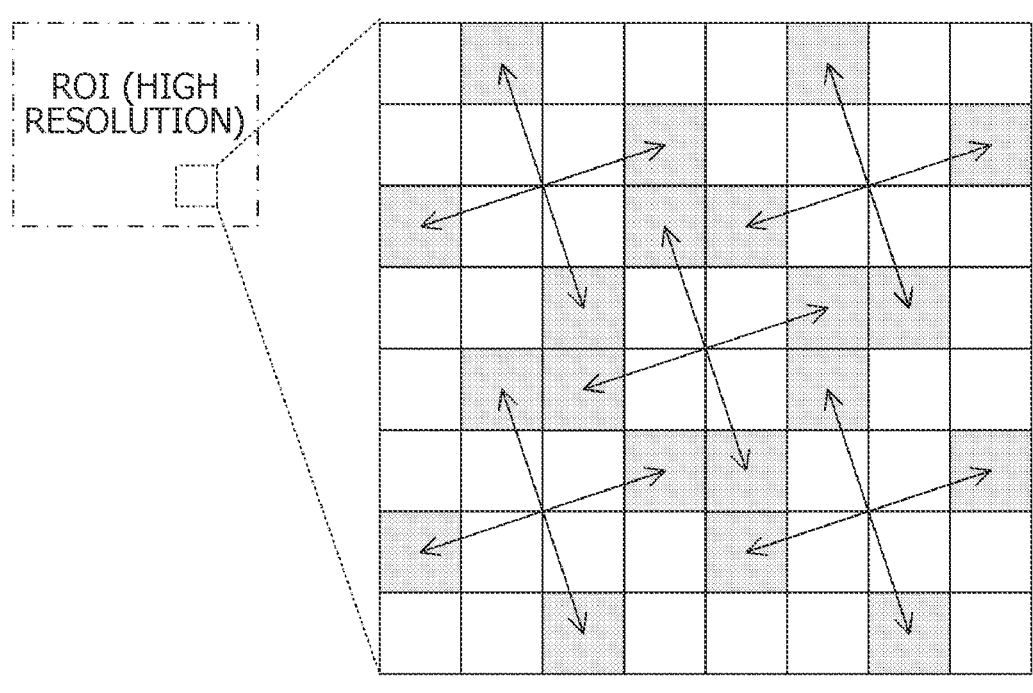
ROI (HIGH RESOLUTION)
b

F I G . 3 7
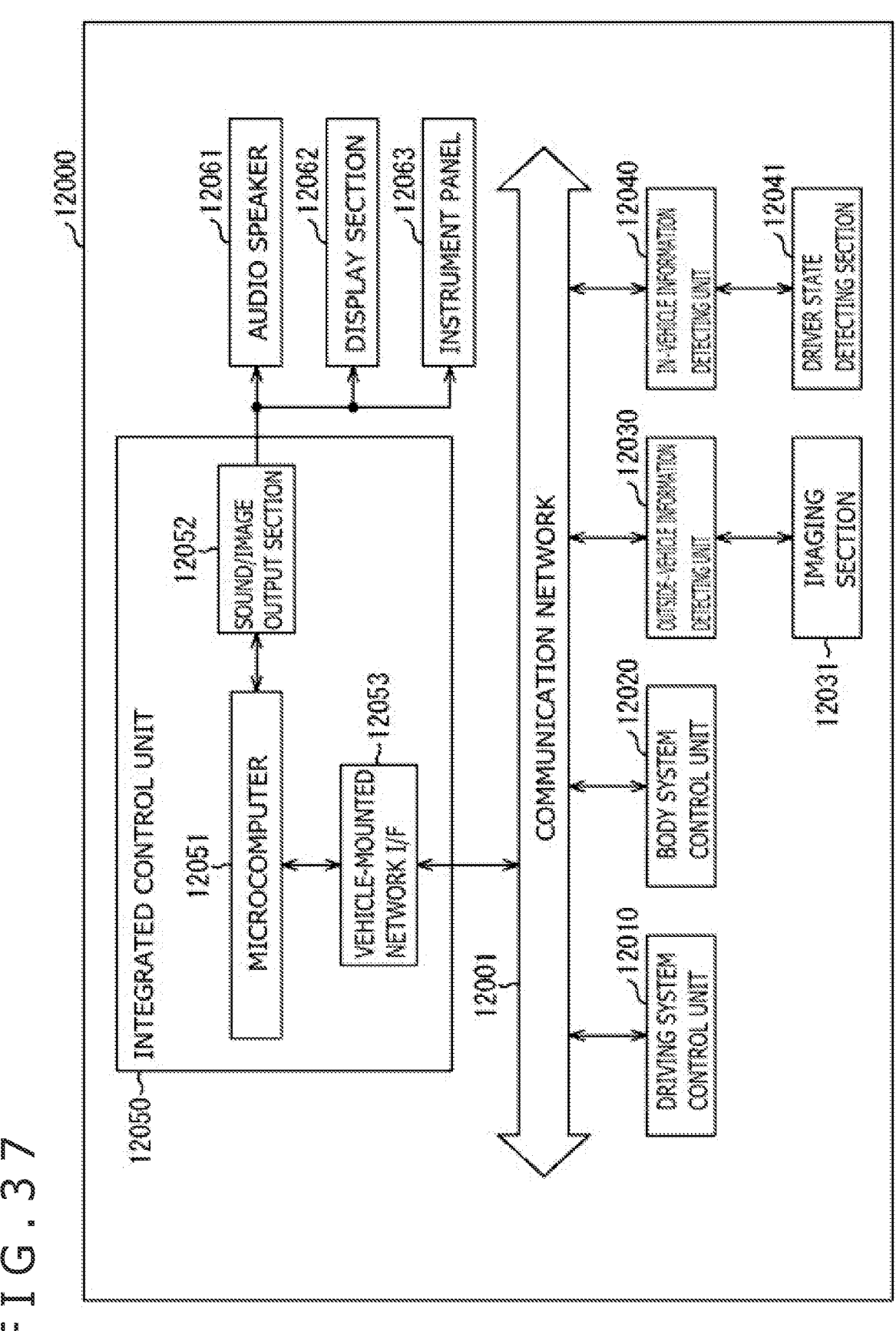

SOLID STATE IMAGING ELEMENT, IMAGING DEVICE, AND SOLID STATE IMAGING ELEMENT CONTROL METHOD

CROSS REFERENCE TO RELATED APPLICATIONS

This application is a national stage application under 35 U.S.C. 371 and claims the benefit of PCT Application No. PCT/JP2022/003503, having an international filing date of 31 Jan. 2022, which designated the United States, which PCT application claimed the benefit of Japanese Patent Application No. 2021-117505, filed 16 Jul. 2021, the entire disclosures of each of which are incorporated herein by reference.

TECHNICAL FIELD

The present technology relates to a solid state imaging element. Specifically, the present technology relates to a solid state imaging element that performs predetermined signal processing, an imaging device, and a solid state imaging element control method.

BACKGROUND ART

In conventional solid state imaging elements, a variety of types of signal processing such as edge detection have been performed on image signals. For example, a solid state imaging element in which a sample and hold circuit for sampling and holding a pair of adjacent pixels is disposed for each column and the pixel signals are compared with each other to detect an edge has been proposed (for example, see PTL 1).

CITATION LIST

Patent Literature

PTL 1: Japanese Patent Laid-Open No. Hei 11-225289

SUMMARY

Technical Problem

In the above-mentioned conventional technology, an analog pixel signal is sampled and held to detect an edge before AD (Analog to Digital) conversion. However, in the above-mentioned solid state imaging element, sample and hold circuits are required for respective columns. Due to this, the circuit scale is increased.

The present technology has been achieved in view of the above circumstances, and an object thereof is to reduce a circuit scale in a solid state imaging element in which signal processing is performed on a pair of pixel signals.

Solution to Problem

The present technology has been achieved in order to solve the above-mentioned problem. A first aspect of the present technology is a solid state imaging element and a control method therefor. The solid state imaging element includes a pixel array section on which a plurality of pixels are arranged in directions of rows and directions of columns, a vertical scanning circuit that selects, from among the plurality of pixels, a pair of pixels disposed on both ends of a predetermined line segment which does not match any of the rows and the columns and which forms an angle of not 45 degrees with respect to the rows and that causes the selected pixels to simultaneously output a pair of pixel signals, and a signal processing circuit that performs predetermined signal processing on the pair of pixel signals. Accordingly, an effect that any sample and hold circuit is not required is provided.

Further, in the first aspect, a predetermined number of unit areas may be arranged on the pixel array section, and the vertical scanning circuit may select the pair of pixels in each of the unit areas. Accordingly, an effect that pixel signals are read out per unit area is provided.

Moreover, in the first aspect, the pixel array section may be sectioned into the predetermined number of unit areas. Accordingly, an effect that pixel signals are read out from each of unit areas that do not overlap each other is provided.

Further, in the first aspect, the predetermined number of unit areas may include a first unit area and a second unit area that are adjacent to each other, the vertical scanning circuit may select a predetermined number of first pixels in the first unit area, and select a predetermined number of second pixels in the second unit area, and a pattern of the second pixels may be linearly symmetric with a pattern of the first pixels. Accordingly, an effect that pixel signals are read out from each of the first and second unit areas which are linearly symmetric with each other is provided.

Moreover, in the first aspect, the predetermined number of unit areas may include a first unit area and a second unit area that are adjacent to each other, and the first unit area and the second unit area may partially overlap with each other. Accordingly, an effect that pixel signals are read out from each of the first and second unit areas which partially overlap with each other is provided.

Further, in the first aspect, 4 rows×4 columns=16 pixels may be arranged in each of the unit areas. Accordingly, an effect that pixel signals are read out per 4 rows×4 columns unit area is provided.

Moreover, in the first aspect, the vertical scanning circuit may select two pairs of pixels in each of the unit areas, the pixels of the two pairs may be disposed in different rows, and the pixels of the two pairs may be disposed in different columns. Accordingly, an effect that one vertical signal line is sufficient for each column is provided.

Further, in the first aspect, the vertical scanning circuit may select a pair of pixels that receive light of the same color. Accordingly, an effect that a pair of pixel signals of the same color are read out is provided.

Moreover, in the first aspect, the vertical scanning circuit may select a pair of pixels that receive light of different colors. Accordingly, an effect that a pair of pixel signals of different colors are read out is provided.

Further, in the first aspect, the plurality of pixels may be arranged in a Bayer layout. Accordingly, an effect that pixel signals are read out from the Bayer layout is provided.

Moreover, in the first aspect, the plurality of pixels may include a pixel that receives infrared light. Accordingly, an effect that pixel signals are read out from the pixel array section including a pixel that receives infrared light is provided.

Further, in the first aspect, the plurality of pixels may be arranged in a quad Bayer layout. Accordingly, an effect that pixel signals are read out from the quad Bayer layout is provided.

Moreover, in the first aspect, each of the plurality of pixels may have a diamond shape having a predetermined diagonal line in parallel with the rows. Accordingly, an effect that pixel signals are read out from the diamond-shaped pixels is provided.

Further, in the first aspect, the signal processing circuit may include a level control circuit that amplifies or attenuates a signal level of one of the pair of pixel signals by a predetermined gain, a comparison circuit that compares the pair of pixel signals after the signal level of one of the pair is amplified or attenuated and that outputs a result of the comparison, and an edge determination circuit that determines presence/absence of an edge on the basis of the result of the comparison. Accordingly, an effect that the presence/absence of an edge is determined from analog signals is provided.

Moreover, in the first aspect, among the plurality of pixels, a predetermined number of adjacent pixels may share a floating diffusion layer. Accordingly, an effect that the number of elements for each pixel is reduced is provided.

Further, in the first aspect, the signal processing may involve a process of extracting a predetermined feature amount from the pair of pixel signals and an image recognition process of determining presence/absence of a predetermined object on the basis of the feature amount and outputting a result of the determination. Accordingly, an effect that the presence/absence of an object is determined is provided.

In addition, in the first aspect, the vertical scanning circuit may change a resolution of a predetermined region on the basis of the result of the determination. Accordingly, an effect that the accuracy of object recognition is improved is provided.

Moreover, in the first aspect, the signal processing may involve a process of generating addition data by adding the pair of pixel signals, a process of extracting a predetermined feature amount from the addition data, and an image recognition process of determining presence/absence of a predetermined object on the basis of the feature amount and outputting a result of the determination. Accordingly, an effect that a feature amount of an object is extracted from data obtained by pixel addition is provided.

Further, a second aspect of the present technology is an imaging device including a solid state imaging element including a pixel array section on which a plurality of pixels are arranged in directions of rows and directions of columns and a vertical scanning circuit that selects, from among the plurality of pixels, a pair of pixels disposed on both ends of a predetermined line segment which does not match any of the rows and the columns and which forms an angle of not 45 degrees with respect to the rows and that causes the selected pixels to simultaneously output a pair of pixel signals, and a digital signal processing circuit that performs predetermined signal processing on the basis of the pair of pixel signals. Accordingly, an effect that a processing amount in the solid state imaging element is reduced is provided.

BRIEF DESCRIPTION OF DRAWINGS

FIG. 4 is a block diagram depicting one configuration example of a signal processing circuit according to the first embodiment of the present technology.

FIG. 5 is a diagram depicting one example of a scanning method according to the first embodiment of the present technology.

FIG. 8 is a diagram depicting other examples of a reading pattern in a unit area having a 4-rows×4-columns size according to the first embodiment of the present technology.

FIG. 9 is a diagram depicting examples of a reading pattern in a unit area having a 3-rows×3-columns size according to the first embodiment of the present technology.

FIG. 12 is a diagram depicting one example of a reading pattern and a scanning method for a case where horizontally adjacent unit areas partially overlap with each other according to the first embodiment of the present technology.

FIG. 14 is a diagram depicting one example of a scanning method for a case where vertically adjacent unit areas partially overlap with each other according to the first embodiment of the present technology.

FIG. 16 is a diagram depicting one example of a scanning method for a case where obliquely adjacent unit areas partially overlap with each other according to the first embodiment of the present technology.

FIG. 18 is a diagram depicting an example of first and second time readings when horizontally and vertically adjacent unit areas partially overlap with each other according to the first embodiment of the present technology.

FIG. 19 is a diagram depicting an example of third and fourth time readings when horizontally and vertically adjacent unit areas partially overlap with each other according to the first embodiment of the present technology.

FIG. 20 is a diagram depicting examples of a reading pattern for a case where color filters are disposed according to the first embodiment of the present technology.

FIG. 21 is a diagram depicting a reading pattern in a quad layout and examples of the quad layout according to the first embodiment of the present technology.

FIG. 22 is a diagram depicting an example of image data before and after pixel addition according to the first embodiment of the present technology.

FIG. 31 is a diagram depicting one configuration example of a pixel array section according to a fourth embodiment of the present technology.

FIG. 34 is a diagram depicting examples of frames according to a fifth embodiment of the present technology.

FIG. 35 is a diagram depicting one example of a ROI before and after a resolution change according to the fifth embodiment of the present technology.

FIG. 37 is a block diagram depicting an example of schematic configuration of a vehicle control system.

DESCRIPTION OF EMBODIMENTS

Hereinafter, embodiments for carrying out the present technology (hereinafter, referred to as "embodiments") will be explained. The explanation will be given according to the following order.

1. First embodiment (in which a pair of pixel signals are read out)
2. Second embodiment (in which a pair of pixel signals are read out and an edge is detected from analog signals)
3. Third embodiment (in which a pair of pixel signals are read out and signal processing is performed outside a solid state imaging element)
4. Fourth embodiment (in which a pair of pixel signals are read out from pixels sharing a floating diffusion layer)

5. Fifth embodiment (in which a pair of pixel signals are read out and a resolution change is made)
6. Examples of applications to mobile bodies

1. First Embodiment

[Configuration Example of Solid State Imaging Element]

Figure 1:
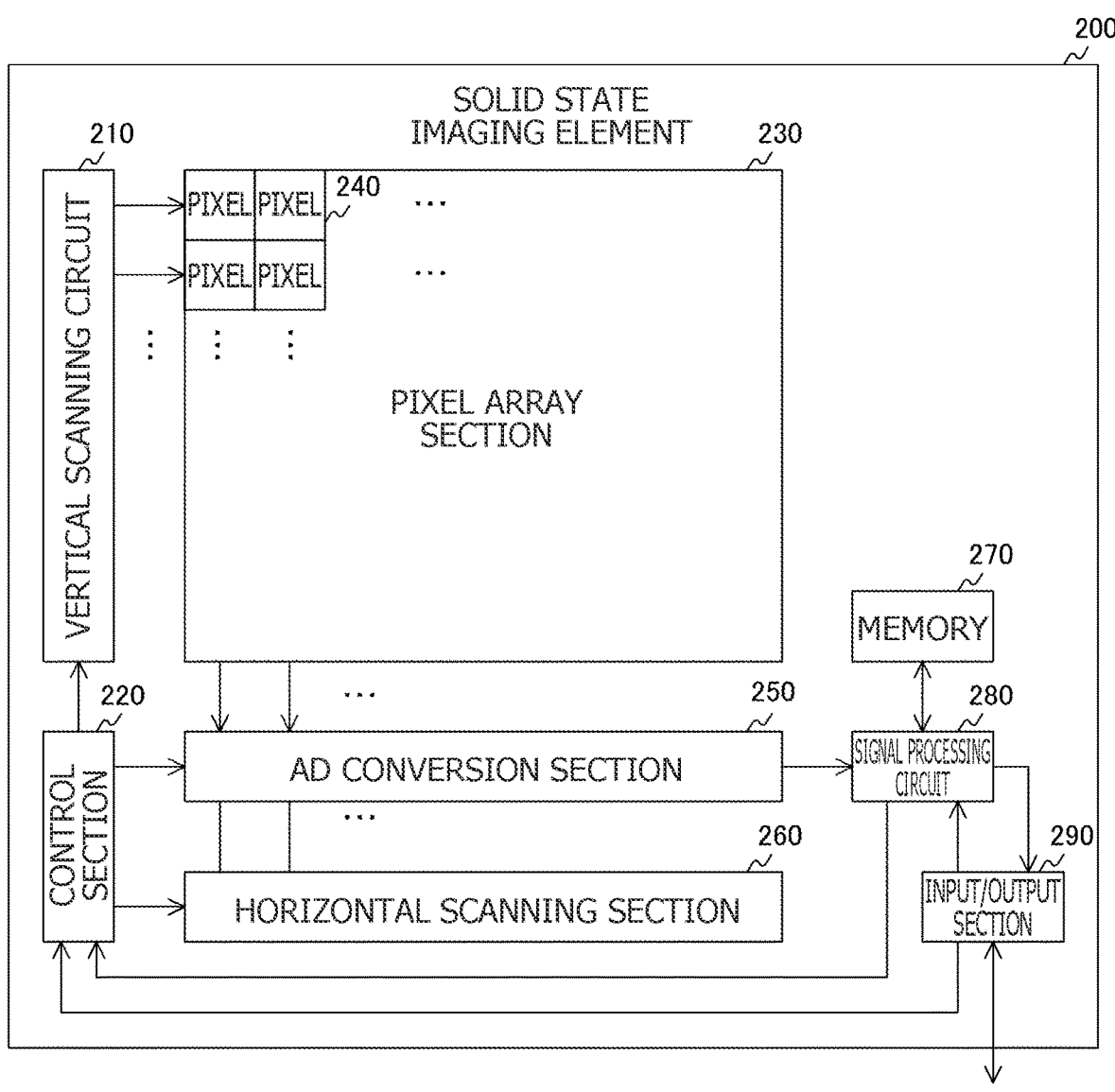
FIG. 1 is a block diagram depicting one configuration example of a solid state imaging element according to a first embodiment of the present technology.

FIG. 1 is a block diagram depicting one configuration example of a solid state imaging element 200 according to a first embodiment of the present technology. The solid state imaging element 200 is configured to capture image data, and includes a vertical scanning circuit 210, a control section 220, a pixel array section 230, an AD conversion section 250, a horizontal scanning section 260, a memory 270, a signal processing circuit 280, and an input/output section 290.

A plurality of pixels 240 are arranged into a two-dimensional lattice shape on the pixel array section 230. In the following explanation, a set of the pixels 240 that are arranged in a horizontal direction is referred to as a "row," and a set of the pixels 240 that are arranged in a vertical direction is referred to as a "column." Each of the pixels 240 performs photoelectric conversion to generate an analog pixel signal.

The vertical scanning circuit 210 drives the pixels 240 to output respective pixel signals (in other words, analog signals). The vertical scanning circuit 210 includes a shift register, for example. The vertical scanning circuit 210 drives the pixels 240 by supplying driving signals to the respective pixels 240 via horizontal pixel driving lines (not depicted). Further, control to drive the pixels 240 and output pixel signals is called "reading." A reading pattern in the pixels 240 will be explained in detail later.

The control section 220 controls the whole solid state imaging element 200. The control section 220 receives a mode signal from the signal processing circuit 280, and receives a control signal (e.g., an exposure time control signal) and a vertical synchronization signal from the input/output section 290. The control section 220 controls the vertical scanning circuit 210, the AD conversion section 250, and the horizontal scanning section 260 on the basis of the received signals.

Here, a mode signal is a signal for specifying any one of a plurality of modes including a feature extraction mode and a normal mode. In the feature extraction mode, some of the pixels are read out, and a feature amount (e.g., an edge) of a subject is extracted on the basis of the read pixels. Further, in the normal mode, all the pixels are read out to generate image data.

The AD conversion section 250 performs AD conversion on pixel signals (analog signals) from each column in the pixel array section 230. In the AD conversion section 250, an ADC (Analog to Digital Converter) is provided for each column, for example, to perform AD conversion by a column ADC method. The type of the ADC in each column is not limited to any type, and any ADC such as a single slope ADC, a double integral ADC, or an SARADC (Successive Approximation Register ADC) may be used therefor.

In addition, the AD conversion section 250 further performs CDS (Correlated Double Sampling) for eliminating fixed pattern noise. The AD conversion section 250 supplies a processed digital pixel signal to the signal processing circuit 280.

The horizontal scanning section 260 supplies a horizontal scan pulse signal to the AD conversion section 250 under control of the control section 220, and causes the AD conversion section 250 to sequentially output the processed pixel signals (or digital signals).

The signal processing circuit 280 performs predetermined signal processing on pixel signals (digital signals). The signal processing includes defect correction, edge detection, image recognition, and other processing. In addition, the memory 270 is used for the signal processing, if needed. The signal processing circuit 280 generates a mode signal on the basis of a result of the image recognition, and supplies the mode signal to the control section 220. In addition, the signal processing circuit 280 supplies image data (i.e., a frame) in which the processed pixel signals are arranged, to the input/output section 290.

The input/output section 290 outputs, to the outside, image data supplied from the signal processing circuit 280. In addition, the input/output section 290 receives a vertical synchronization signal and a control signal from the outside, and supplies the signals to the control section 220 and the signal processing circuit 280.

It is to be noted that the vertical scanning circuit 210 and at least a part of the circuits (e.g., the ADC or a comparator in the ADC) in the respective columns may be disposed on chips that are separate from the remaining circuits. In this case, these chips are electrically connected to each other by TSV (Through Silicon Via), by Cu-Cu connection, or via a connection section such as a micro-bump.

[Configuration Example of Pixel Array Section]

Figure 2:
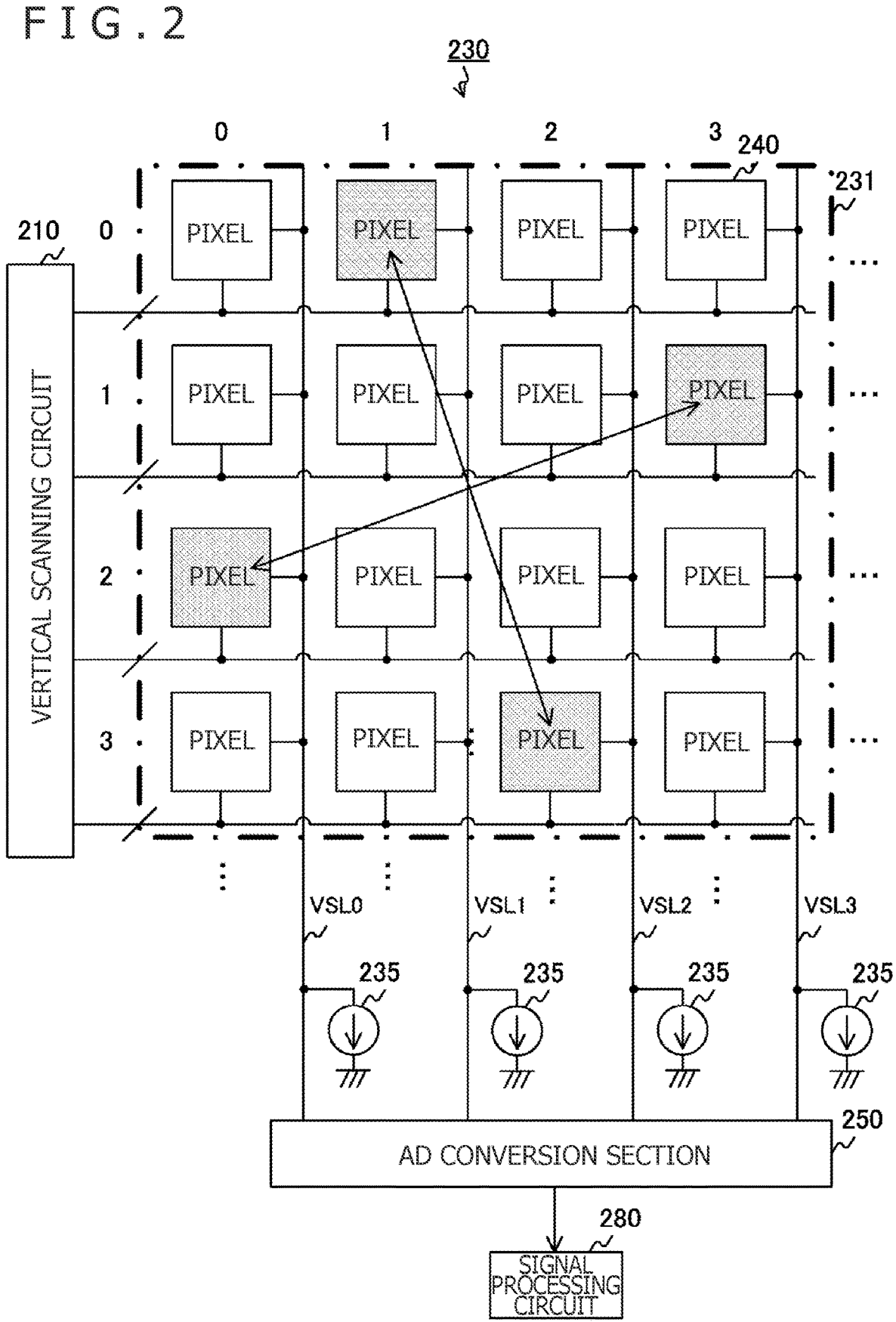
FIG. 2 is a diagram depicting one configuration example of a pixel array section according to the first embodiment of the present technology.

FIG. 2 is a diagram depicting one configuration example of the pixel array section 230 according to the first embodiment of the present technology. A plurality of the pixels 240 are arranged in directions of rows and directions of columns on the pixel array section 230. In addition, the pixel array section 230 is sectioned into a predetermined number of unit areas such as unit areas 231. For example, 4 rows×4 columns=16 pixels are arranged in each of the unit areas.

In addition, in the pixel array section 230, one vertical signal line VSL is disposed for each column, and a plurality of pixel driving lines are laid for each row. Each of the pixels 240 is connected to the AD conversion section 250 via the vertical signal line VSL, and is connected to the vertical scanning circuit 210 via the pixel driving line. Load MOS circuits 235 are connected to the respective vertical signal lines VSL.

In each unit area 231, a zeroth column and a first column are connected to a vertical signal line VSL0 and a vertical signal line VSL1, respectively. A second column and a third column are connected to a vertical signal line VSL2 and a vertical signal line VSL3, respectively.

In the normal mode, the vertical scanning circuit 210 sequentially selects and drives the rows. As a result, all the pixels in the pixel array section 230 are read out, whereby image data is generated.

On the other hand, in the feature extraction mode, the vertical scanning circuit 210 selects two pixel pairs in each unit area. The pixels of one of the two pixel pairs are disposed on both ends of a line segment that does not match any of the rows and columns and forms an angle of not 45 degrees with respect to the rows. Also, the pixels of the other pair are disposed on both ends of a line segment that does not match any of the rows and columns and forms an angle of not 45 degrees with respect to the rows. In addition, the pixels of the two pairs are disposed in different rows and different columns. Line segments having arrows at both ends thereof in FIG. 2 are some of the examples of the line segment that forms an angle of not 45 degrees with respect to the rows.

In a unit area such as the unit area 231, (m, n) indicates the relative coordinates of a pixel at an m-th (m is an integer of 0 to 3) column and an n-th (n is an integer of 0 to 3) row. In the feature extraction mode, the vertical scanning circuit 210 selects a pixel (1, 0) and a pixel (2, 3) as a pixel pair in each unit area, for example, and causes the selected pixels to simultaneously output a pair of pixel signals. Next, the vertical scanning circuit 210 selects a pixel (0, 2) and a pixel (3, 1) as a pixel pair, and causes the selected pixels to simultaneously output a pair of pixel signals. Gray pixels in FIG. 2 indicate pixels that are read out in the feature extraction mode. This similarly applies to the remaining drawings. Then, the signal processing circuit 280 performs predetermined signal processing on the read pixel signals.

In the pattern depicted in FIG. 2, a pair of pixel signals are read out from different vertical signal lines. Consequently, the AD conversion section 250 can perform AD conversion on the pixel signals simultaneously by a column ADC method.

In contrast, in the solid state imaging element disclosed in PTL 1, a pair of pixel signals are read out from the same column, so that each column requires a sample and hold circuit for holding the pixel signals. Further, there is a problem that kTC noise is superimposed on the pixel signals during sampling.

If two vertical signal lines are disposed for each column and a pair of pixel signals are read out from the same column, the sample and hold circuit is unnecessary. However, two vertical signal lines and two ADCs are required in each column. Hence, miniaturization is difficult.

In a case where reading is performed in the pattern depicted in FIG. 2, a sample and hold circuit is unnecessary, so that kTC noise can be suppressed. In addition, one vertical signal line and one ADC are sufficient for each column.

[Configuration Example of Pixel]

Figure 3:
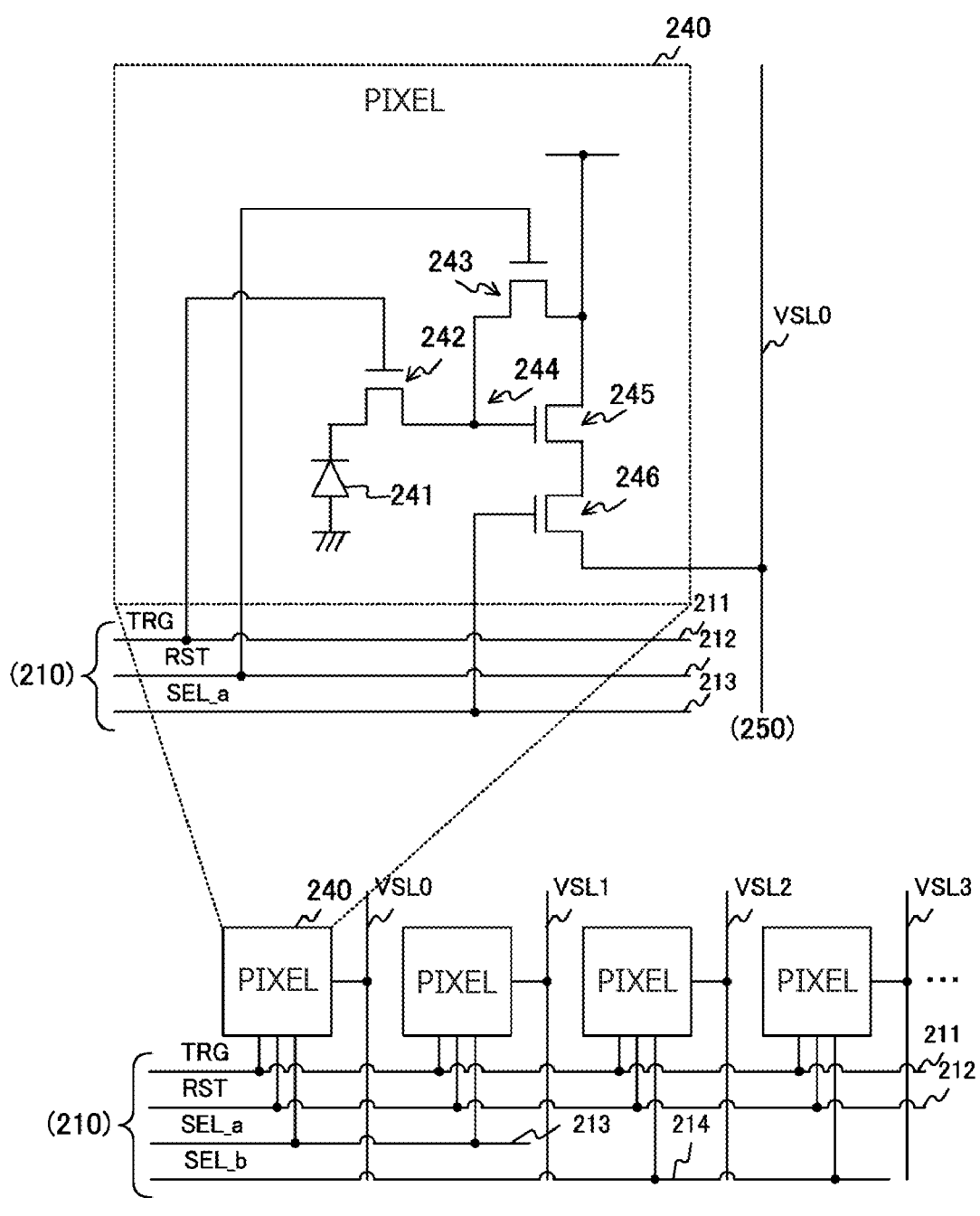
FIG. 3 is a circuit diagram depicting one configuration example of a pixel according to the first embodiment of the present technology.

FIG. 3 is a circuit diagram depicting one configuration example of a pixel 240 according to the first embodiment of the present technology. In the pixel array section 230, a transfer line 211, a reset line 212, a selection line 213, and a selection line 214 are laid as pixel driving lines in each row. The transfer line 211 and the reset line 212 are connected in common to the pixels in the row.

To read out a pair of pixel signals in each of the first row and the second row simultaneously in the above-mentioned reading pattern, the zeroth and third columns in each of these rows need to be connected to different selection lines. Selection lines to which the first and second columns in the first and second rows are connected are freely determined. Further, to read out a pair of pixel signals of each of the zeroth row and the third row simultaneously, the first and second columns in each of these rows need to be connected to different selection lines. Selection lines to which the zeroth and third columns in the first and second rows are connected are freely determined. For example, the zeroth and first columns in all the rows are connected to the selection line 213 while the second and third columns in all the rows are connected to the selection line 214.

In addition, the pixel 240 includes a photoelectric conversion element 241, a transfer transistor 242, a reset transistor 243, a floating diffusion layer 244, an amplification transistor 245, and a selection transistor 246.

The photoelectric conversion element 241 generates an electric charge through photoelectric conversion. The transfer transistor 242 transfers the electric charge from the photoelectric conversion element 241 to the floating diffusion layer 244 according to a transfer signal TRG. The transfer signal TRG is supplied from the vertical scanning circuit 210 via the transfer line 211.

The reset transistor 243 extracts the electric charge from the floating diffusion layer 244 and executes initialization according to a reset signal RST. The reset signal RST is supplied from the vertical scanning circuit 210 via the reset line 212. The floating diffusion layer 244 stores the transferred electric charge, and generates a voltage according to the electric charge amount.

The amplification transistor 245 amplifies the voltage of the floating diffusion layer 244. The selection transistor 246 outputs, as a pixel signal, an analog signal of the amplified voltage to the AD conversion section 250 via a vertical signal line according to a selection signal SEL_a or SEL_b. The selection signal SEL_a is supplied from the vertical scanning circuit 210 via the selection line 213. The selection signal SEL_b is supplied from the vertical scanning circuit 210 via the selection line 214.

In a case where a pair of pixels in the first and second rows are selected and also in a case where a pair of pixels in the zeroth and third rows are selected in the above-mentioned reading pattern, selection signals are supplied via two selection lines. Accordingly, there is no variation in the load on the vertical scanning circuit 210.

In contrast, in a configuration in which a pair of pixels in a row are selected and then a pair of pixels in a column are selected, for example, the number of selection lines to be used varies. Accordingly, variation in the load on the vertical scanning circuit 210 is generated. In this case, there is a concern over degradation in the signal quality of the pixel signals.

[Configuration Example of Signal Processing Circuit]

FIG. 4 is a block diagram depicting one configuration example of the signal processing circuit 280 according to the first embodiment of the present technology. The signal processing circuit 280 includes a digital signal processing section 281, a feature extraction section 282, and an image recognition section 283.

The digital signal processing section 281 performs a variety of processes such as defection correction and dark correction on each pixel signal. The digital signal processing section 281 supplies image data (a frame) in which processed pixel signals are arranged, to the feature extraction section 282 and the input/output section 290.

It is to be noted that the digital signal processing section 281 can further perform demosaicing. In this case, pixel signals that have not yet undergone demosaicing are supplied to the feature extraction section, and a frame that has undergone demosaicing is supplied to the input/output section 290.

The feature extraction section 282 extracts a predetermined feature amount on the basis of a pixel signal supplied from the digital signal processing section 281. In the feature amount extraction mode, the feature extraction section 282 compares pixel signals of a pair of pixels in the above-mentioned reading pattern, for example, and detects an edge as a feature amount on the basis of the comparison result. The feature extraction section 282 supplies the feature amount to the image recognition section 283. On the other hand, in the normal mode, the feature extraction section 282 is stopped.

The image recognition section 283 determines the presence/absence of a predetermined object such as a human or a face (or recognizes an object) by using a rule base or a DNN (Deep Neural Network), on the basis of a feature amount. In a case of determining that there is an object during the feature extraction mode, the image recognition section 283 sets the normal mode. On the other hand, in a case of determining that there is no object during the feature extraction mode, the image recognition section 283 continues the feature extraction mode. The image recognition section 283 generates a mode signal indicating a mode to be set, and supplies the mode signal to the feature extraction section 282 and the control section 220.

FIG. 5 is a diagram depicting one example of a scanning method according to the first embodiment of the present technology. In FIG. 5, "a" depicts a diagram depicting one example of a reading pattern for reading four rows. In FIG. 5, "b" depicts a diagram depicting one example of a reading pattern for reading four rows next to the rows in "a."

As depicted in "a" in FIG. 5, the vertical scanning circuit 210 reads out two pixel signal pairs of four rows, from each unit area such as the unit area 231.

Subsequently, the vertical scanning circuit 210 reads out two pixel signal pairs of the next four rows, from each unit area such as a unit area 232. The unit area 232 is vertically adjacent to the unit area 231, and does not overlap with the unit area 231. Unit areas other than the unit areas 231 and 232 also do not overlap with each other.

It is to be noted that the same reading pattern is adopted in each unit area in the drawing, but reading patterns that are linearly symmetric with each other may be adopted in two adjacent unit areas.

Figure 6:
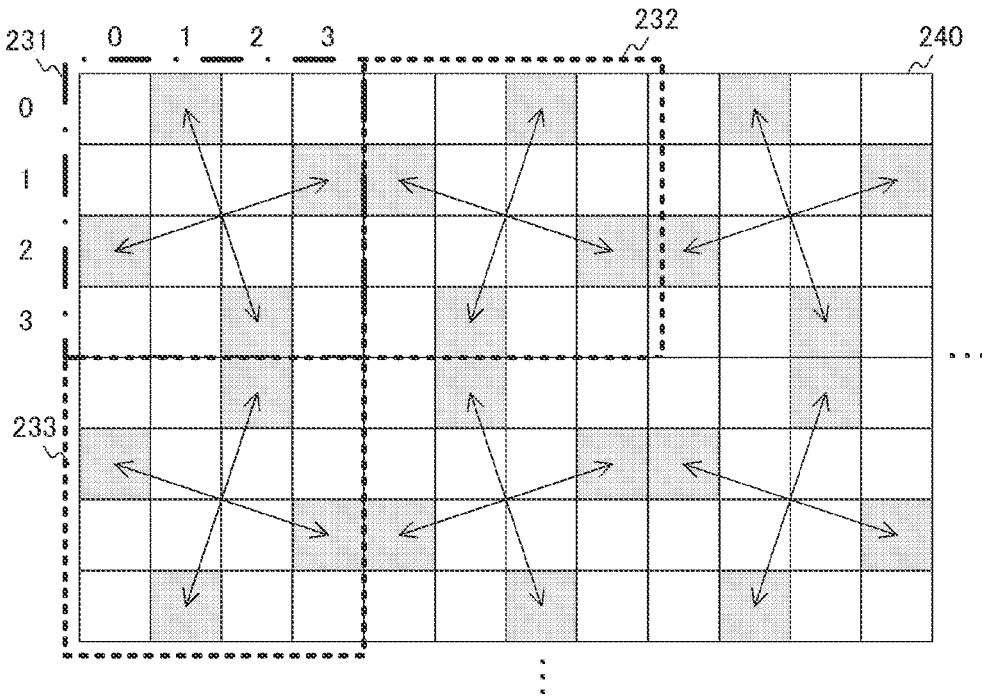
FIG. 6 is a diagram depicting an example in which reading patterns in adjacent unit areas are linearly symmetric with each other according to the first embodiment of the present technology.

For example, the reading pattern adopted in the unit area 231 may be linearly symmetric with the reading pattern adopted in each of unit areas 232 and 233 that are horizontally or vertically adjacent to the unit area 231, as depicted in FIG. 6. In other words, a mirror layout can be adopted. It is to be noted that the unit area 231 is one example of the first unit area set forth in the claims, and the unit area 232 is one example of the second unit area set forth in the claims. A pixel that is selected in the unit area 231 is one example of the first pixel set forth in the claims, and a pixel that is selected in the unit area 232 is one example of the second pixel set forth in the claims.

Figure 7:
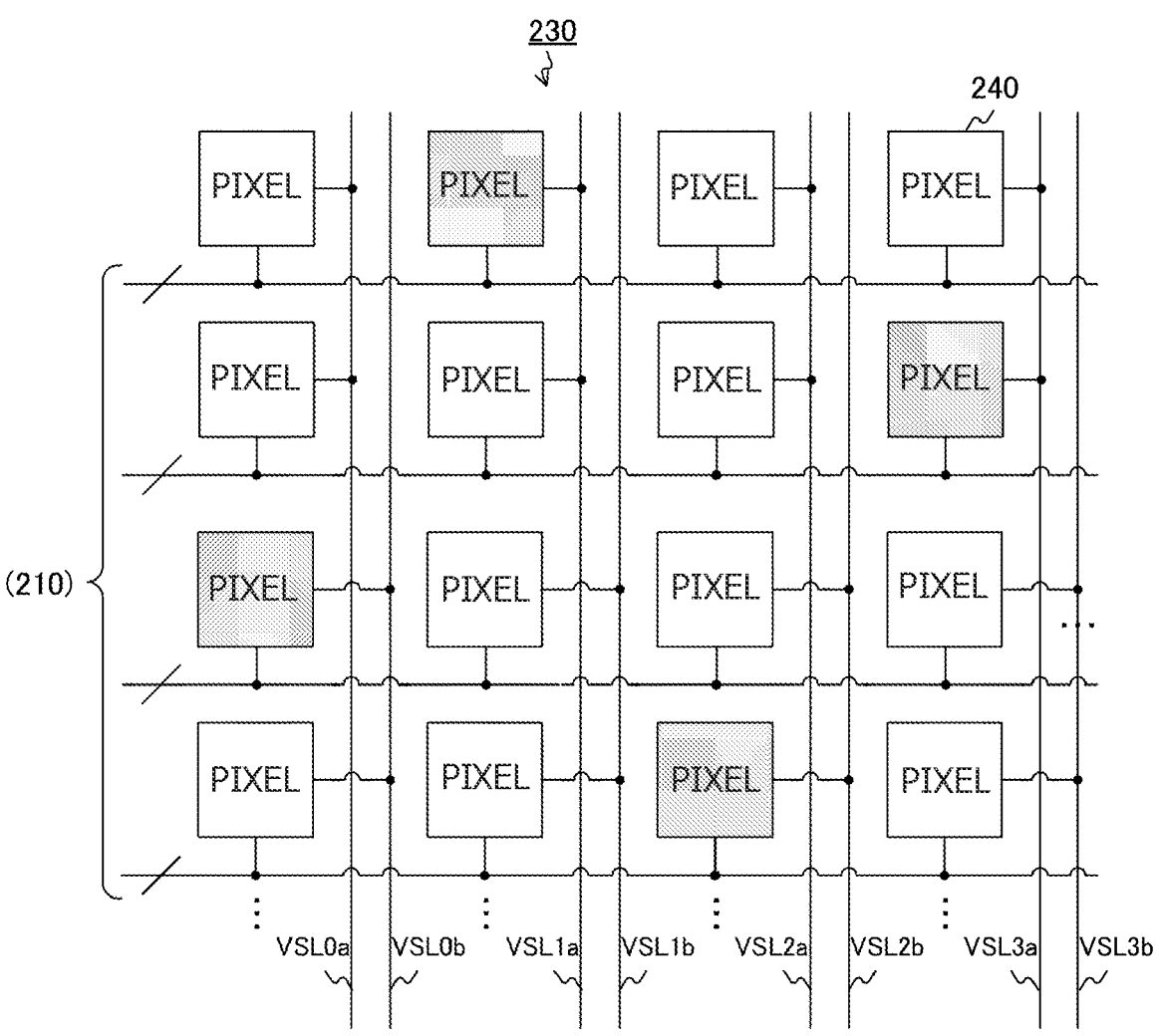
FIG. 7 is a diagram depicting another example of the pixel array section according to the first embodiment of the present technology.

In addition, two vertical signal lines may be disposed in each column, as depicted in FIG. 7. In this case, vertical signal lines VSL0*a*, VSL0*b*, VSL1*a*, VSL1*b*, VSL2*a*, VSL2*b*, VSL3*a*, and VSL3*b* are disposed for four columns. Further, for example, two of the columns on the upper side are connected to the vertical signal lines VSL0*a*, VSL1*a*, VSL2*a*, and VSL3*a*, while the remaining two columns on the lower sides are connected to the vertical signal lines VSL0*b*, VSL1*b*, VSL2*b*, and VSL3*b*. Further, one selection line is disposed for each row. The AD conversion section 250 provides ADCs (not depicted) for the respective vertical signal lines. Alternatively, the AD conversion section 250 provides one selector (not depicted) and one ADC for each column, and switches the connection destination of the ADC to either one of the two vertical signal lines through the selector.

In addition, a reading pattern to be adopted in a unit area is not limited to the patterns depicted in FIG. 5 as long as a pair of selected pixels are disposed on both ends of a line segment that does not match any of the rows and columns and forms an angle of not 45 degrees with respect to the rows.

For example, the vertical scanning circuit 210 may select a pixel (0, 0) and a pixel (1, 3) as a pair, as depicted in "a" of FIG. 8. Also, the vertical scanning circuit 210 may select a pixel (0, 0) and a pixel (2, 3) as a pair, as depicted in "b" of FIG. 8. Also, the vertical scanning circuit 210 may select a pixel (0, 1) and a pixel (3, 2) as a pair, as depicted in "c" of FIG. 8.

In addition, the size of each unit area is set to 4×4 in the drawings, but is not limited thereto.

For example, the size of each unit area may be set to 3×3, as depicted in FIG. 9. In this case, the vertical scanning circuit 210 may select a pixel (0, 0) and a pixel (1, 2) as a pair, for example, as depicted in "a" of FIG. 9. Alternatively, the vertical scanning circuit 210 may select a pixel (0, 0) and a pixel (2, 1) as a pair, for example, as depicted in "b" of FIG. 9.

Figure 10:
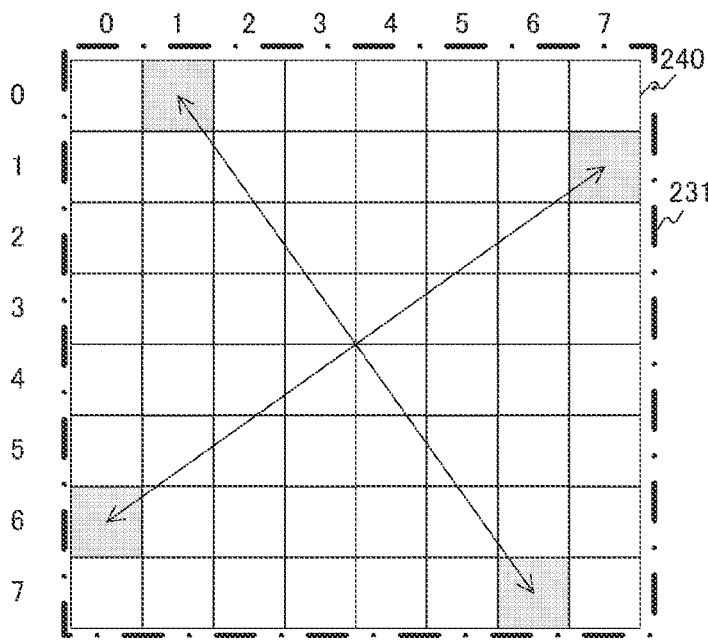
FIG. 10 is a diagram depicting one example of a reading pattern in a unit area having an 8-rows×8-columns size according to the first embodiment of the present technology.

Also, the size of each unit area may be set to 8×8, as depicted in FIG. 10. In this case, the vertical scanning circuit 210 selects two pixel pairs in each unit area, for example. One of the two pixel pairs consists of a pixel (1, 0) and a pixel (6, 7), and the other pair consists of a pixel (0, 6) and a pixel (7, 1), for example.

The size of each unit area is determined on the basis of characteristics including the resolution of an image to be outputted to the feature extraction section 282 and the spatial frequency of a target from which a feature is to be extracted. For example, the size is determined to be larger when the spatial frequency is lower.

In a case where the size of each unit area is set to 8×8, the unit areas may be arranged in such a manner as not to overlap with each other, or adjacent two of the unit areas may be arranged in such a manner as to partially overlap with each other, if the resolution is insufficient.

Figure 11:
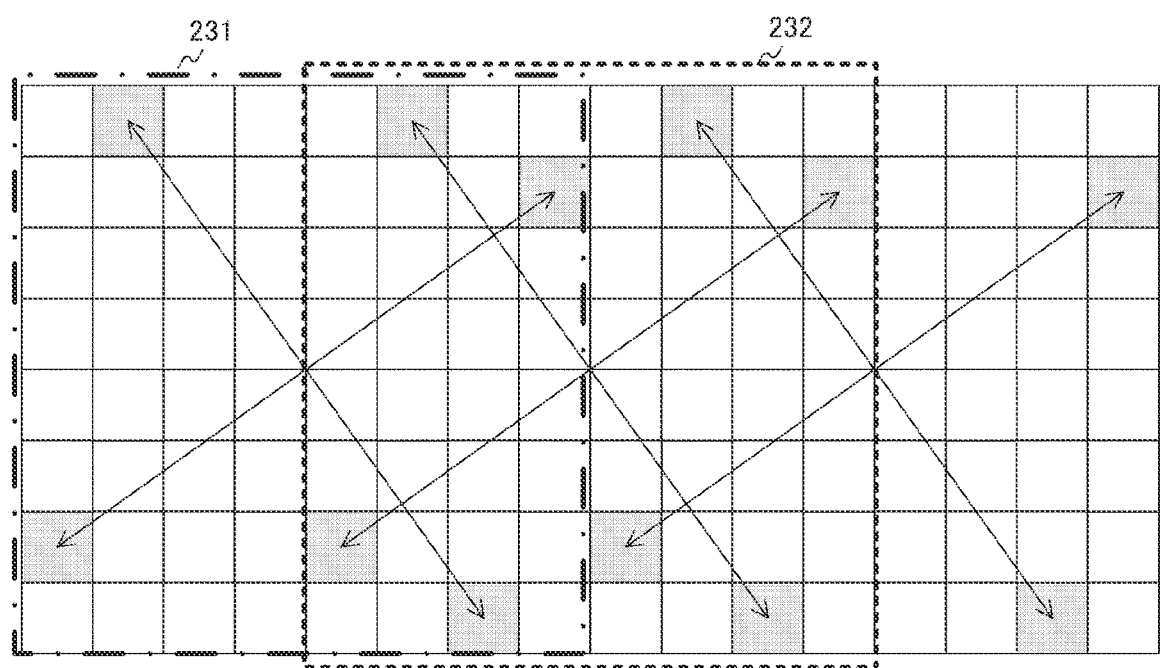
FIG. 11 is a diagram depicting one example of a layout of unit areas according to the first embodiment of the present technology.

For example, as depicted in FIG. 11, the unit area 231 overlaps with the unit area 232 which is horizontally (i.e., in a row direction) adjacent to the unit area 231, by four columns. In other words, the unit area 232 is shifted from the unit area 231 by four columns. Other than the unit areas 231 and 232, each unit area also overlap with the adjacent unit area by four columns. It is to be noted that the unit areas do not overlap with each other in the vertical direction (i.e., in a column direction).

Also in a case where each unit area has a size of 4×4, adjacent two of the unit areas can be arranged in such a manner as to partially overlap with each other.

For example, as depicted in "a" of FIG. 12, the unit area 231 may overlap with the unit area 232 which is horizontally adjacent to the unit area 231, by two columns. In other words, the unit area 232 may be shifted from the unit area 231 by two columns. It is to be noted that the unit areas do not overlap with each other in the vertical direction. In this case, the vertical scanning circuit 210 selects and reads out a pixel (1, 0) and a pixel (2, 3) as a pair in each of unit areas that are arranged in the horizontal direction, for example, as depicted in "b" of FIG. 12. Subsequently, the vertical scanning circuit 210 selects and reads out a pixel (0, 2) and a pixel (3, 1) as a pair, from each of the unit areas that are arranged in the horizontal direction, as depicted in "c" of FIG. 12.

Figure 13:
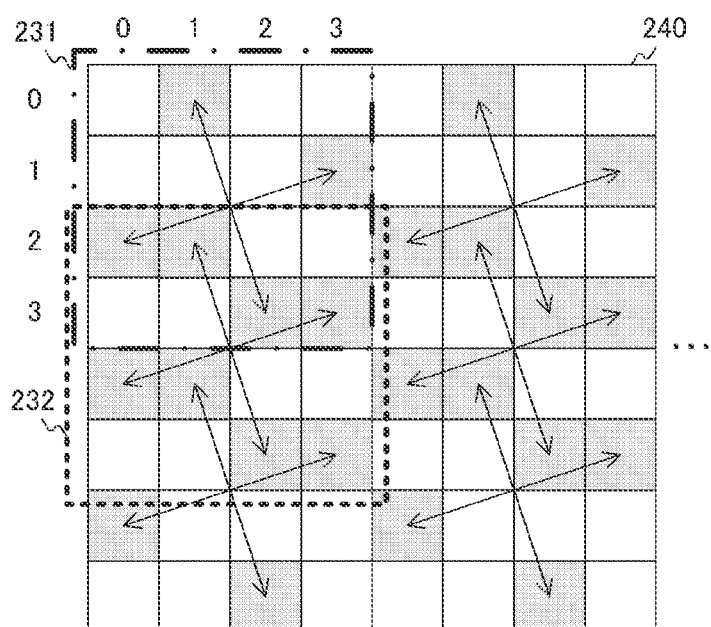
FIG. 13 is a diagram depicting one example of a reading pattern for a case where vertically adjacent unit areas partially overlap with each other according to the first embodiment of the present technology.

Also, the unit area 231 may overlap with the unit area 232 which is vertically (i.e., in the column direction) adjacent to the unit area 231, by two rows, for example, as depicted in FIG. 13. In other words, the unit area 232 may be shifted from the unit area 231 by two rows. It is to be noted that the unit areas do not overlap with each other in the horizontal direction. In this case, it is sufficient if the position of a unit area to be read is shifted by each two rows during reading.

For example, the vertical scanning circuit 210 reads out two pairs from each unit area such as the unit area 231, as depicted in "a" of FIG. 14. Subsequently, the vertical scanning circuit 210 shifts the reading target unit area by two rows, and reads out two pairs from each unit area such as the unit area 232, as depicted in "b" of FIG. 14.

Figure 15:
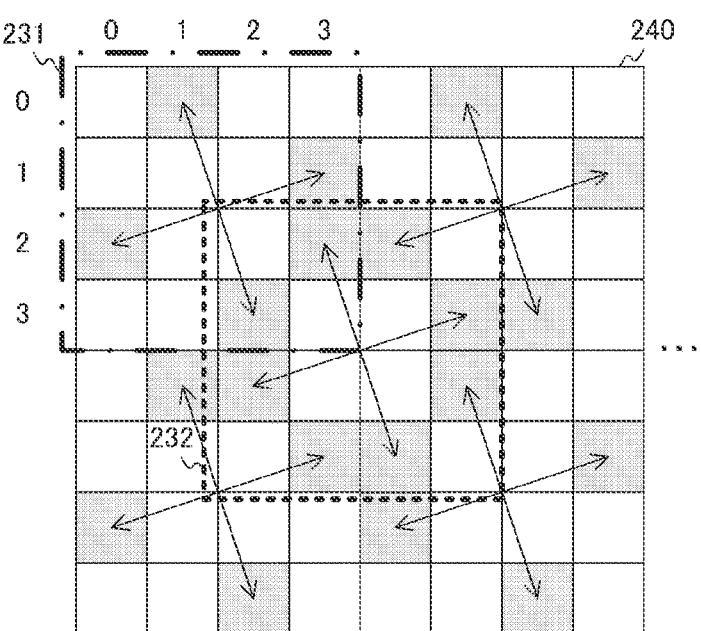
FIG. 15 is a diagram depicting one example of a reading pattern for a case where obliquely adjacent unit areas partially overlap with each other according to the first embodiment of the present technology.

Alternatively, the unit area 231 may overlap with the unit area 232 which is obliquely adjacent to the unit area 231, by two columns and two columns, as depicted in FIG. 15. In other words, the unit area 232 may be shifted from the unit area 231 by two columns and further shifted by two rows. In this case, it is sufficient if the position of a unit area to be read is shifted in an oblique direction during reading.

For example, the vertical scanning circuit 210 reads out two pairs from each unit area such as the unit area 231, as depicted in "a" of FIG. 16. Subsequently, the vertical scanning circuit 210 shifts the reading target unit area by two rows and two columns, and reads out two pairs from each unit area such as the unit area 232, as depicted in "b" of FIG. 16.

Figure 17:
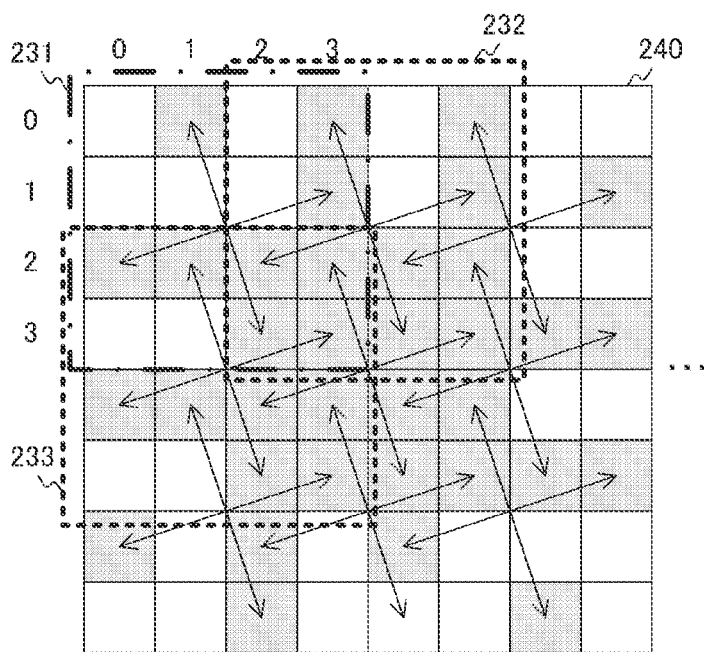
FIG. 17 is a diagram depicting one example of a reading pattern for a case where horizontally and vertically adjacent unit areas partially overlap with each other according to the first embodiment of the present technology.

Also, the unit area 231 may overlap with the unit area 232 that is horizontally adjacent to the unit area 231, by two columns, and the unit area 231 may overlap with a unit area 233 that is vertically adjacent to the unit area 231, by two rows, as depicted in FIG. 17. In this case, it is sufficient if the position of a unit area to be read is shifted by each two rows during reading.

The vertical scanning circuit 210 selects and reads out a pixel (1, 0) and a pixel (2, 3) as a pair in each of the horizontally arranged unit areas, for example, as depicted in "a" of FIG. 18. Subsequently, the vertical scanning circuit 210 selects and reads out a pixel (0, 2) and a pixel (3, 1) as a pair, from each of the horizontally arranged unit areas, as depicted in "b" of FIG. 18.

Further, the vertical scanning circuit 210 shifts the reading target unit area by two rows, and selects and reads out a pixel (1, 0) and a pixel (2, 3) as a pair, from each of the unit areas, as depicted in "a" of FIG. 19. Subsequently, the vertical scanning circuit 210 selects and reads out a pixel (0, 2) and a pixel (3, 1) as a pair, from each of the unit areas, as depicted in "b" of FIG. 19.

When reading is performed in a manner such as that depicted in FIG. 18 or 19, the number of pixels read in each column is one. Thus, one vertical signal line and one ADC are sufficient for each column. In addition, irrespective of which one of the two pairs is selected during reading, the number of selection lines that are simultaneously used is two. Accordingly, there is no variation in the load on the vertical scanning circuit 210. In such a manner, it is sufficient if a pair of pixels to be simultaneously read out are disposed in different rows and columns even in a case where two adjacent unit areas partially overlap with each other.

In addition, the number of rows and the number of columns (or a shift amount) by which a unit area is shifted are set to "4" or "2" in FIGS. 11 to 19, but the shift amount is not limited to these values. When the size of a unit area is set to N rows x N columns, the shift amount can be set to N/M, where N represents an integer and M represents a submultiple of N. For example, in a case where N is "4" and M is "2," the shift amount is "2."

In addition, a variety of kinds of filters can be provided to respective pixels. For example, R (Red), G (Green), B (Blue), Y (Yellow), and infrared light (IR: InfraRed) filters can be used. Pixels provided with these filters are referred to as an R pixel, a G pixel, a B pixel, a Y pixel, and an IR pixel, respectively.

For example, R pixels, G pixels, and B pixels can be arranged in a Bayer layout, as depicted in "a" of FIG. 20. In this case, the vertical scanning circuit 210 can read out a pair of pixels (0, 2) and (3, 3) that receive light of the same color, or can read out a pair of pixels (1, 1) and (3, 0) that receive light of different colors.

In addition, whether or not to read out a pair of pixels of the same color depends on an extraction process of a feature amount. For example, to detect an edge in the extraction process, a pair of pixels of the same color are read out in many cases. In addition, to obtain the color difference in the extraction, a pair of pixels of different colors are read out.

In addition, R pixels, G pixels, B pixels, and IR pixels may be arranged, as depicted in "b" and "c" of FIG. 20. In this case, one R pixel, one G pixel, and one B pixel may be arranged in each 2×2 area, as depicted in "b" of FIG. 20. Alternatively, any one of an R pixel, a G pixel, and a B pixel and three IR pixels may be arranged in each 2×2 area, as depicted in "c" of FIG. 20.

In addition, R pixels, G pixels, B pixels, and Y pixels may be arranged, as depicted in "d" of FIG. 20.

In addition, R pixels, G pixels, B pixels, and B pixels may be arranged in a quad Bayer layout in which four pixels of the same color are adjacent to one another, as depicted in "a" of FIG. 21. In this case, the size of the unit area 231 can be set to 8×8, for example. Further, the vertical scanning circuit 210 can select a B pixel (2, 0) and a B pixel (7, 4) as a pair. Also, the vertical scanning circuit 210 can select a G pixel (0, 5) and a G pixel (7, 2) as a pair.

In addition, when R pixels, G pixels, and B pixels are arranged, nine adjacent pixels of the same color can be arranged, as depicted in "b" of FIG. 21, or 16 adjacent pixels of the same color can be arranged, as depicted in "c" of FIG. 21.

In addition, when pixel signals are read out from the pixel array section 230 having a Bayer layout, the signal processing circuit 280 may perform pixel addition.

For example, the size of each unit area is set to 8×8, as depicted in "a" of FIG. 22. In addition, the vertical scanning circuit 210 reads out pixels (0, 4), (0, 5), (1, 4), (1, 5), (2, 0), (2, 1), (3, 0), (3, 1), (4, 6), (4, 7), (5, 6), (5, 7), (6, 2), (6, 3), (7, 2), and (7, 3).

Then, the signal processing circuit 280 adds adjacent 2 rows×2 columns=4 pixels to generate monochrome addition data. As a result of this pixel addition, two addition data pairs are generated, as depicted in "b" of FIG. 22. Next, the signal processing circuit 280 extracts a feature amount (e.g., an edge) from the addition data. It is to be noted that the signal processing circuit 280 adds four pixels but can also add 3×3=9 pixels instead.

Figure 23:
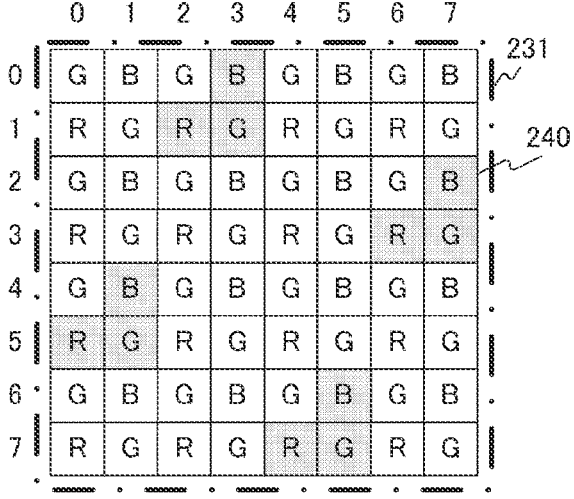
FIG. 23 is a diagram depicting another example of image data according to the first embodiment of the present technology.

Alternatively, in the pixel addition, the vertical scanning circuit 210 may read out some of the four adjacent pixels, and the signal processing circuit 280 may add the read pixels, as depicted in FIG. 23. For example, three of the four adjacent pixels, that is, one of two G pixels, an R pixel, and a B pixel, are added, in FIG. 23.

It is to be noted that a dual PD (PhotoDiode) configuration in which two photoelectric conversion elements are provided for each pixel may be used. The difference between a dual PD and a quad Bayer layout is about whether one on-chip lens is provided for a plurality of photoelectric conversion elements, or on-chip lenses are provided for the respective photoelectric conversion elements. A combination of the number of on-chip lenses and the number of photodiodes can be determined as appropriate.

Figure 24:
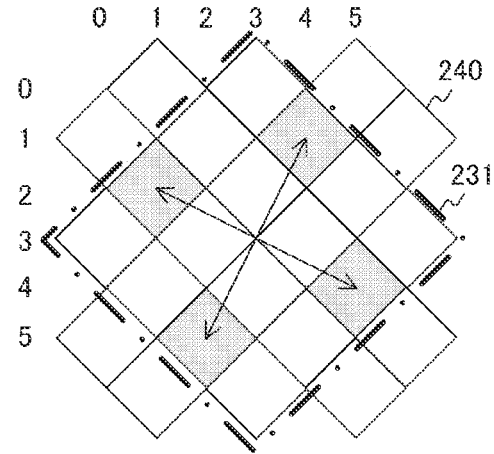
FIG. 24 is a diagram depicting one example of a reading pattern when diamond-shaped pixels are arranged according to the first embodiment of the present technology.

In addition, diamond-shaped pixels each having a predetermined diagonal line in parallel with the rows may be arranged, as depicted in FIG. 24. Unit areas and a reading pattern in FIG. 24 are obtained by rotating the unit areas and the reading pattern depicted in FIG. 5 by a 45-degrees angle. The size of each unit area is set to 4×4 in FIG. 24, but the above-mentioned color filters and the number N can freely be combined.

[Operational Example of Solid State Imaging Element]

Figure 25:
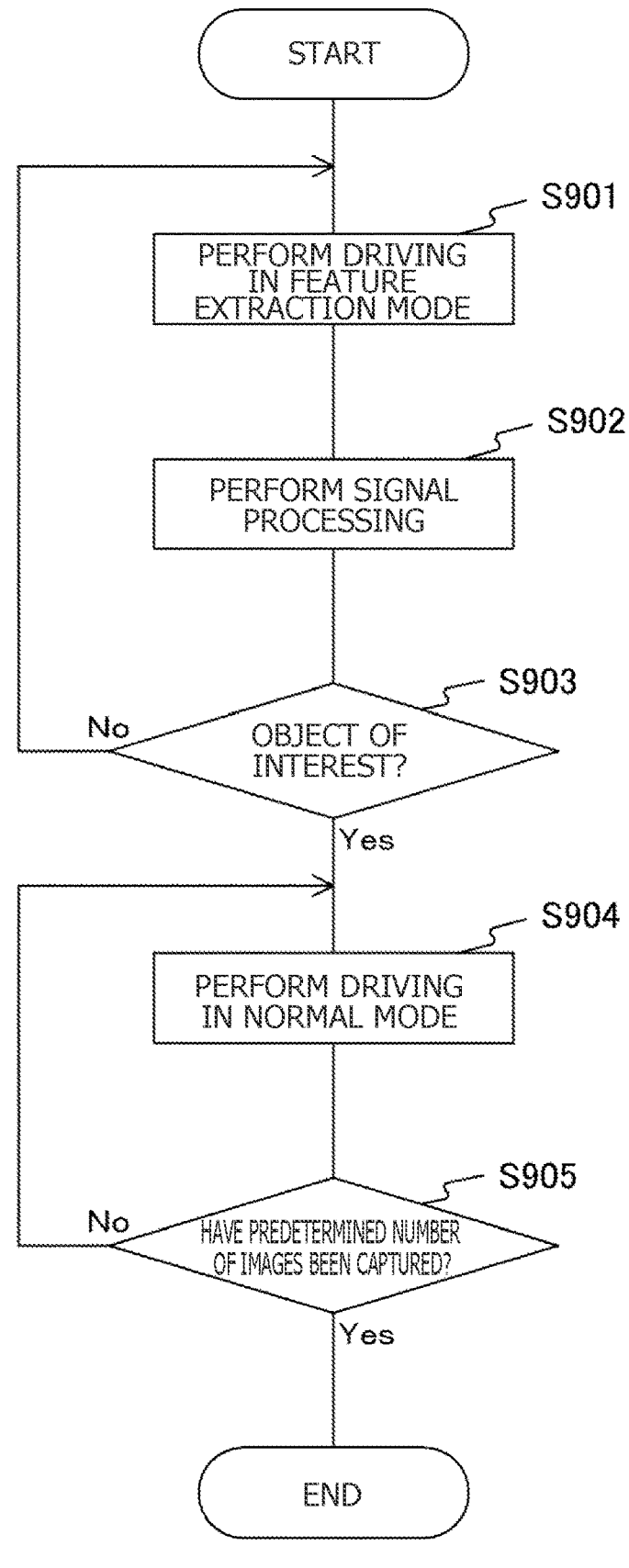
FIG. 25 is a flowchart of one example of operation of the solid state imaging element according to the first embodiment of the present technology.

FIG. 25 is a flowchart of one example of operation of the solid state imaging element 200 according to the first embodiment of the present technology. For example, when a predetermined application for capturing image data is executed, this operation is started.

The vertical scanning circuit 210 of the solid state imaging element 200 is driven in the feature extraction mode, and selects two pixels pairs in each unit area and causes the selected pixels to output pixel signals (step S901). The signal processing circuit 280 performs signal processing such as feature amount extraction and image recognition, on the pixel signals (step S902).

The signal processing circuit 280 determines whether or not a subject is a predetermined object of interest, on the basis of a result of the image recognition (step S903). In a case where the subject is not an object of interest (No in step S903), the solid state imaging element 200 repeats step S901 and the subsequent steps.

On the other hand, in a case where the subject is an object of interest (Yes in step S903), the vertical scanning circuit 210 is driven in the normal mode, and selects all the pixels and causes the selected pixels to output pixel signals (step S904). Then, the solid state imaging element 200 determines whether or not a predetermined number of frames have been captured (step S905). In a case where the predetermined number of frames have not been captured (No in step S905), the solid state imaging element 200 repeats step S904 and the subsequent step. In a case where the predetermined number of frames have been captured (Yes in step S905), the solid state imaging element 200 exits the operation for image capturing. It is to be noted that, to obtain an image of an object of interest, a still image may be captured, or a video image may be captured.

As explained so far, in the first embodiment of the present technology, the vertical scanning circuit 210 selects a pair of pixels disposed on both ends of a predetermined line segment that does not match any of the rows and columns and forms an angle of not 45 degrees with respect to the rows. Accordingly, no sample and hold circuit is required, so that the circuit scale can be reduced. Moreover, kTC noise during sampling can be suppressed.

2. Second Embodiment

Unlike the above-mentioned first embodiment in which the signal processing circuit 280 detects an edge on the basis of AD-converted pixel signals, an edge may be detected on the basis of pixel signals that have not yet undergone AD conversion. The solid state imaging element 200 according to the second embodiment is different from that of the first embodiment in that an edge is detected on the basis of pixel signals that have not yet undergone AD conversion.

Figure 26:
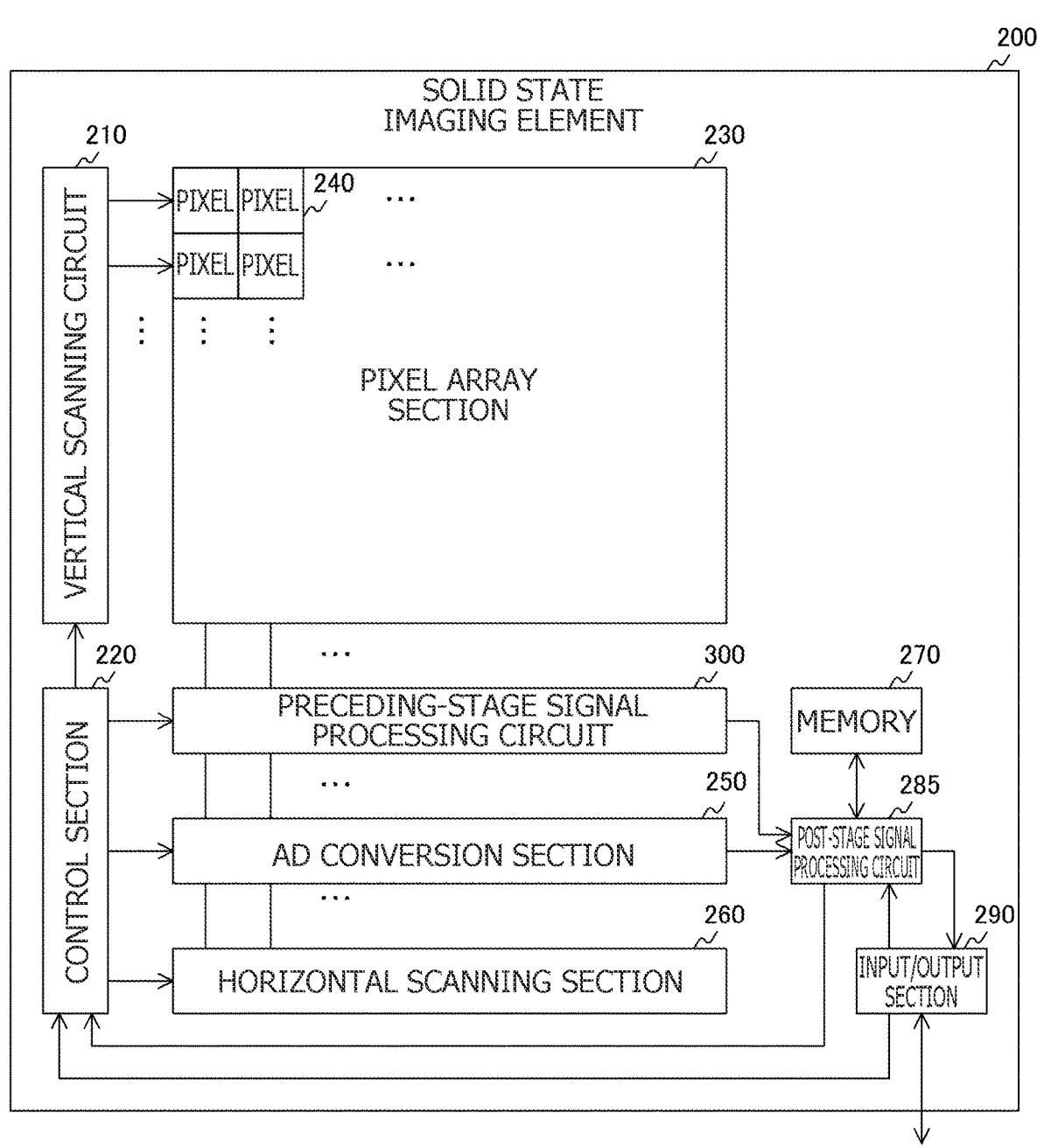
FIG. 26 is a block diagram depicting one configuration example of a solid state imaging element according to a second embodiment of the present technology.

FIG. 26 is a block diagram depicting one configuration example of the solid state imaging element 200 according to the second embodiment of the present technology. The solid state imaging element 200 according to the second embodiment is different from that of the first embodiment in including a preceding-stage signal processing circuit 300 and a post-stage signal processing circuit 285 instead of the signal processing circuit 280.

The preceding-stage signal processing circuit 300 detects an edge on the basis of pixel signals (analog signals) from the pixel array section 230 in the feature extraction mode. The preceding-stage signal processing circuit 300 supplies a result of the edge detection to the post-stage signal processing circuit 285. The post-stage signal processing circuit 285 determines the presence/absence of an object on the basis of the detection result.

Figure 27:
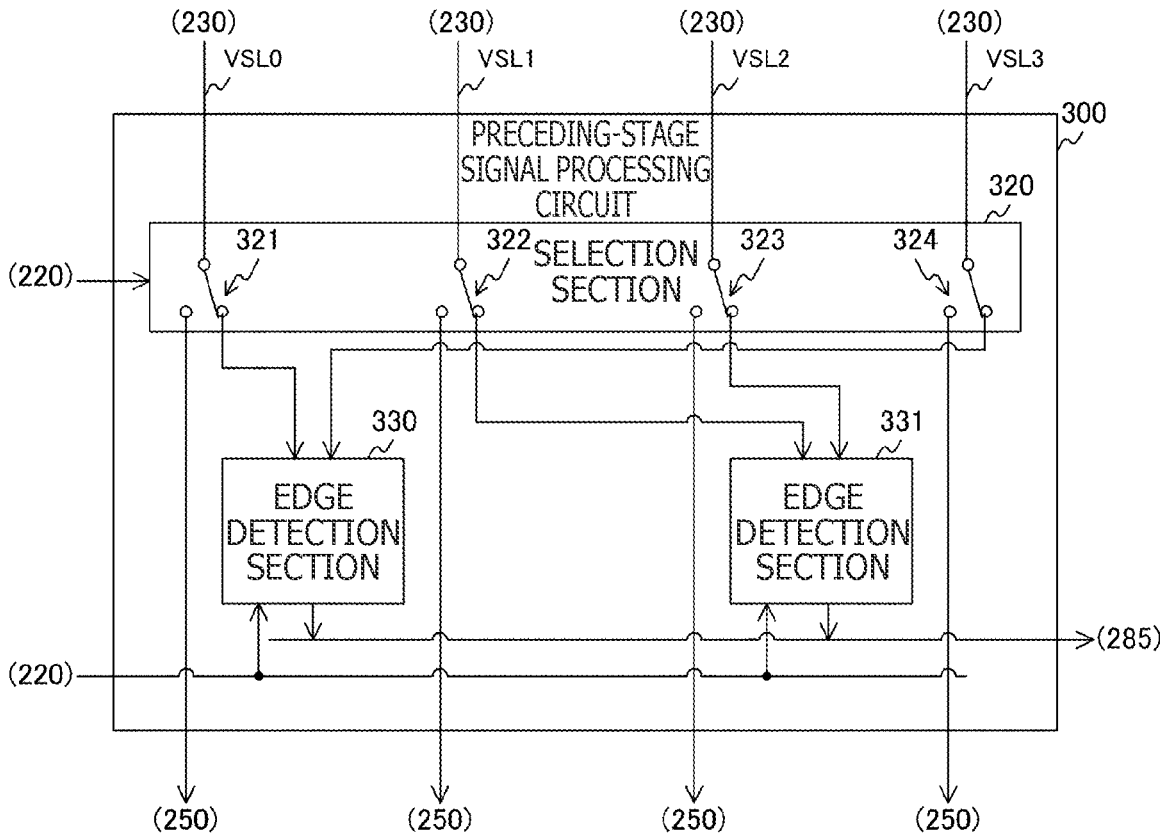
FIG. 27 is a block diagram depicting one configuration example of a preceding-stage signal processing circuit according to the second embodiment of the present technology.

FIG. 27 is a block diagram depicting one configuration example of the preceding-stage signal processing circuit 300 according to the second embodiment of the present technology. A plurality of selection sections 320 and a plurality of edge detection sections including an edge detection section 330 and an edge detection section 331 are arranged on the preceding-stage signal processing circuit 300. For example, the selection sections 320 are disposed in respective unit areas. In addition, the edge detection sections are disposed for each two rows. The pattern depicted in FIG. 5, for example, is adopted as a reading pattern in each unit area.

The selection section 320 includes selectors 321 to 324. The selector 321 switches a connection destination of a vertical signal line VSL0 between the AD conversion section 250 and the edge detection section 330 under control of the control section 220. The selector 322 switches a connection destination of a vertical signal line VSL1 between the AD conversion section 250 and the edge detection section 331 under control of the control section 220.

The selector 323 switches a connection destination of a vertical signal line VSL2 between the AD conversion section 250 and the edge detection section 331 under control of the control section 220. The selector 324 switches a connection destination of a vertical signal line VSL3 between the AD conversion section 250 and the edge detection section 330 under control of the control section 220.

The edge detection section 330 detects the presence/absence of an edge on the basis of one pixel signal pair from the vertical signal lines VSL0 and VSL3. The edge detection section 331 detects the presence/absence of an edge on the basis of one pixel signal pair from the vertical signal lines VSL1 and VSL2. The edge detection sections 330 and 331 supply detection results to the post-stage signal processing circuit 285.

In the feature extraction mode, the control section 220 controls the selection section 320 to connect vertical signal lines to the edge detection sections 330 and 331. On the other hand, in the normal mode, the control section 220 controls the selection section 320 to connect vertical signal lines to the AD conversion sections 250. The edge detection sections 330 and 331 are stopped.

Figure 28:
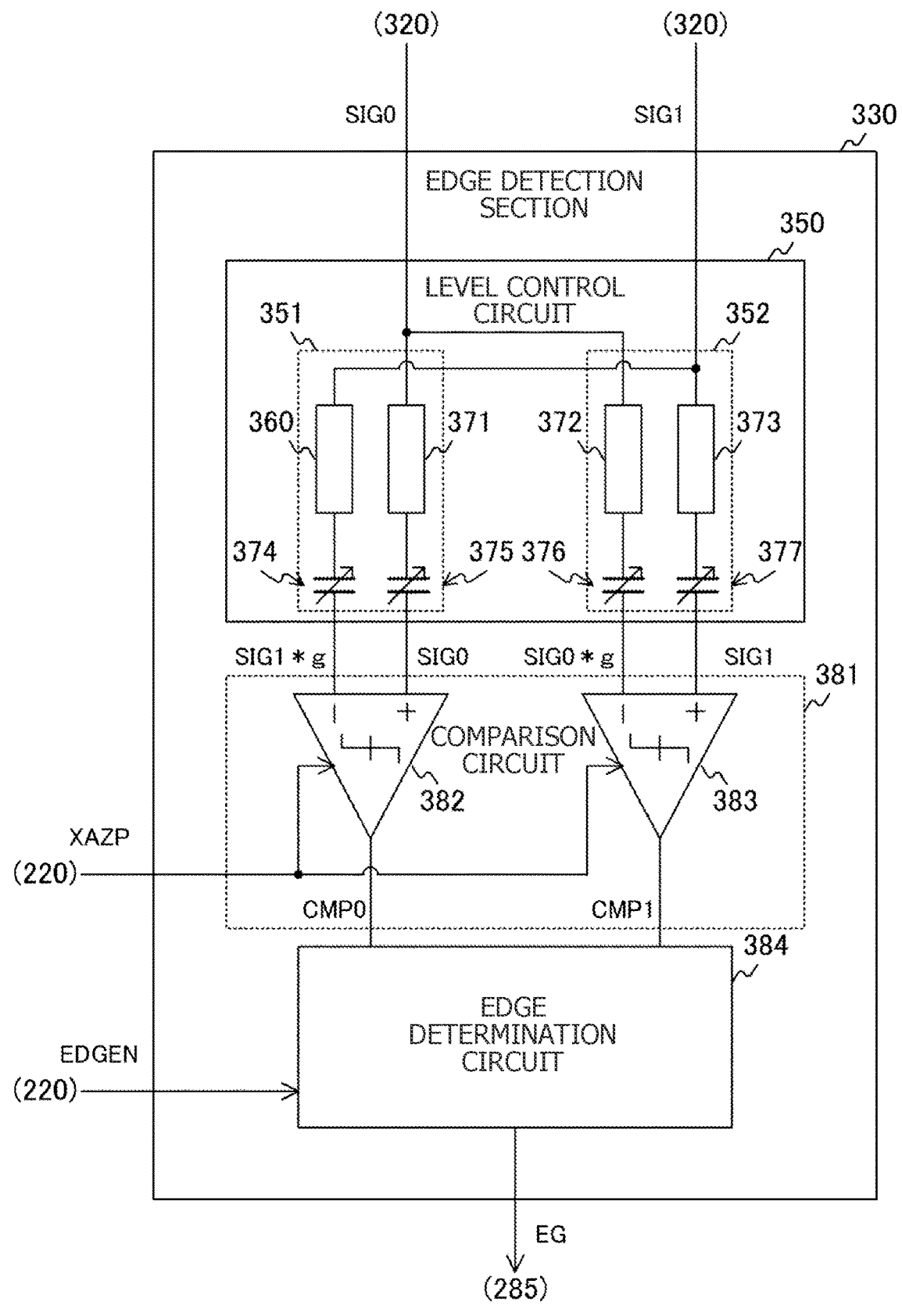
FIG. 28 is a circuit diagram depicting one configuration example of an edge detection section according to the second embodiment of the present technology.

FIG. 28 is a circuit diagram depicting one configuration of the edge detection section 330 according to the first embodiment of the present technology. The edge detection section 330 includes a level control circuit 350, a comparison circuit 381, and an edge determination circuit 384. Further, comparators 382 and 383 are arranged on the comparison circuit 381. It is to be noted that the configuration of the edge detection section 331 is similar to that of the edge detection section 330.

The level control circuit 350 amplifies or attenuates a pair of pixel signals at different gains. The level control circuit 350 includes gain circuits 351 and 352. Pixel signals SIG0 and SIG1 are inputted from the selection section 320 to each of the gain circuits 351 and 352.

The gain circuit 351 amplifies or attenuates the pixel signal SIG1 at a relative gain g, and outputs the resultant pixel signal SIG1 and the pixel signal SIG0 to the comparator 382. Source follower circuits 360 and 371 and variable capacitances 374 and 375 are arranged on the gain circuit 351. The source follower circuit 360 and the variable capacitance 374 are disposed in series between a signal line from which the pixel signal SIG1 is transmitted and an inversion input terminal (−) of the comparator 382. In addition, the source follower circuit 371 and the variable capacitance 375 are disposed in series between a signal line from which the pixel signal SIG0 is transmitted and a non-inversion input terminal (+) of the comparator 382. It is to be noted that the ratio of the capacity of the variable capacitance 374 and the capacity of the variable capacitance 375 is set to a predetermined value.

In the gain circuit 351, the source follower circuit 360 amplifies or attenuates the pixel signal SIG1 at a predetermined gain $g1$ while the source follower circuit 371 amplifies or attenuates the pixel signal SIG0 at a gain $g0$ that is different from the gain $g1$. $g0$ and $g1$ are real numbers. When a gain that is greater than 1 is set, a pixel signal is amplified. When a gain that is less than 1 is set, a pixel signal is attenuated. With this configuration, the gain circuit 351 can amplify or attenuate the pixel signal SIG0 at the gain $g0$, and can amplify or attenuate the pixel signal SIG1 at the gain $g1$. Here, when $g1/g0$ is defined as the relative gain g, it can be considered that the gain circuit 351 amplifies or attenuates only the pixel signal SIG1 at the gain g and outputs the pixel signal SIG1 as it is.

The gain circuit 352 amplifies or attenuates the pixel signal SIG0 at a relative gain g, and outputs the resultant pixel signal SIG0 and the pixel signal SIG0 to the comparator 383. Source follower circuits 372 and 373 and variable capacitances 376 and 377 are arranged on the gain circuit 352.

In addition, the source follower circuit 372 and the variable capacitance 376 are disposed in series between the signal line from which the pixel signal SIG0 is transmitted and an inversion input terminal (−) of the comparator 383. In addition, the source follower circuit 373 and the variable capacitance 377 are disposed in series between the signal line from which the pixel signal SIG1 is transmitted and a non-inversion input terminal (+) of the comparator 383. It is to be noted that the ratio of the capacity of the variable capacitance 376 and the capacity of the variable capacitance 377 is set to a predetermined value.

Moreover, in the gain circuit 352, the source follower circuit 372 amplifies or attenuates the pixel signal SIG0 at a predetermined gain $g0$ while the source follower circuit 373 amplifies or attenuates the pixel signal SIG1 at a gain $g1$. With this configuration, the gain circuit 352 can amplify or attenuate only the pixel signal SIG0 at the relative gain g, and can output the pixel signal SIG1 as it is.

It is to be noted that the gain circuits 351 and 352 can amplify or attenuate a pixel signal by using a circuit (e.g., an amplifier circuit) other than the source follower circuit. In addition, the source follower circuits are disposed for both the vertical signal lines VSL0 and VSL1, but may be disposed for only either one of these vertical signal lines. In this case, the respective source follower circuits on the gain circuits 351 and 352 are disposed for different vertical signal lines.

The comparator 382 compares the pixel signal SIG1 amplified at the relative gain g with the pixel signal SIG0. The comparator 382 supplies a comparison result CMP0 to the edge determination circuit 384.

The comparator 383 compares the pixel signal SIG0 amplified at the relative gain g with the pixel signal SIG1. The comparator 383 supplies a comparison result CMP1 to the edge determination circuit 384.

In addition, the comparators 382 and 383 are initialized by an inversion signal XAZP from the control section 220.

The edge determination circuit 384 determines the presence/absence of an edge under control of the control section 220. An enable signal EDGEN is inputted from the control section 220 to the edge determination circuit 384. In a case where the edge determination circuit 384 is enabled by the enable signal EDGEN, the edge determination circuit 384 determines the presence/absence of an edge on the basis of the comparison results CMP0 and CMP1, and outputs the determination result as an edge detection result EG. On the other hand, in a case where the edge determination circuit 384 is disabled, the edge determination circuit 384 refrains from determining the presence/absence of an edge. The details of the circuits in FIG. 28 are disclosed in PCT Patent Publication No. WO2021/090538.

Since the edge detection section 330 detects an edge on the basis of an analog signal that has not yet undergone AD conversion, as depicted in FIG. 28, AD conversion is unnecessary in the feature extraction mode.

Figure 29:
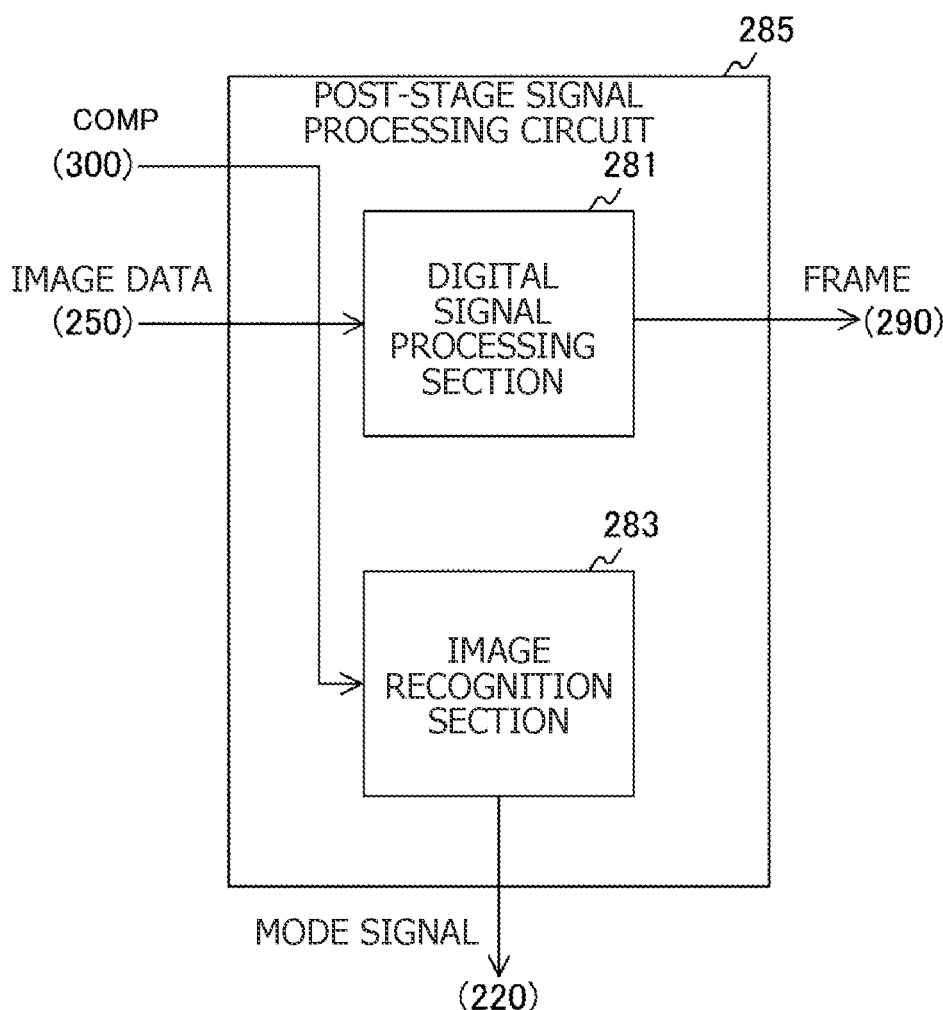
FIG. 29 is a block diagram depicting one configuration example of a post-stage signal processing circuit according to the second embodiment of the present technology.

FIG. 29 is a block diagram depicting one configuration example of the post-stage signal processing circuit 285 according to the second embodiment of the present technology. The post-stage signal processing circuit 285 according to the second embodiment includes the digital signal processing section 281 and the image recognition section 283.

The digital signal processing section 281 performs a variety of processes such as defection correction and dark correction on each pixel signal, and supplies a processed frame to the input/output section 290.

The image recognition section 283 determines the presence/absence of a predetermined object such as a human or a face on the basis of a feature amount, generates a mode signal on the basis of a result of the determination, and supplies the mode signal to the control section 220.

As explained so far, the edge detection section 330 detects an edge on the basis of pixel signals (analog signals) that have not yet undergone AD conversion, in the second embodiment of the present technology. Accordingly, AD conversion is unnecessary in the feature extraction mode.

3. Third Embodiment

In the above-mentioned first embodiment in which extraction of a feature amount and recognition of an object are performed in the solid state imaging element 200, it is difficult to reduce a processing amount in the solid state imaging element 200. The third embodiment is different from the first embodiment in that extraction of a feature amount and recognition of an object are performed outside the solid state imaging element 200.

Figure 30:
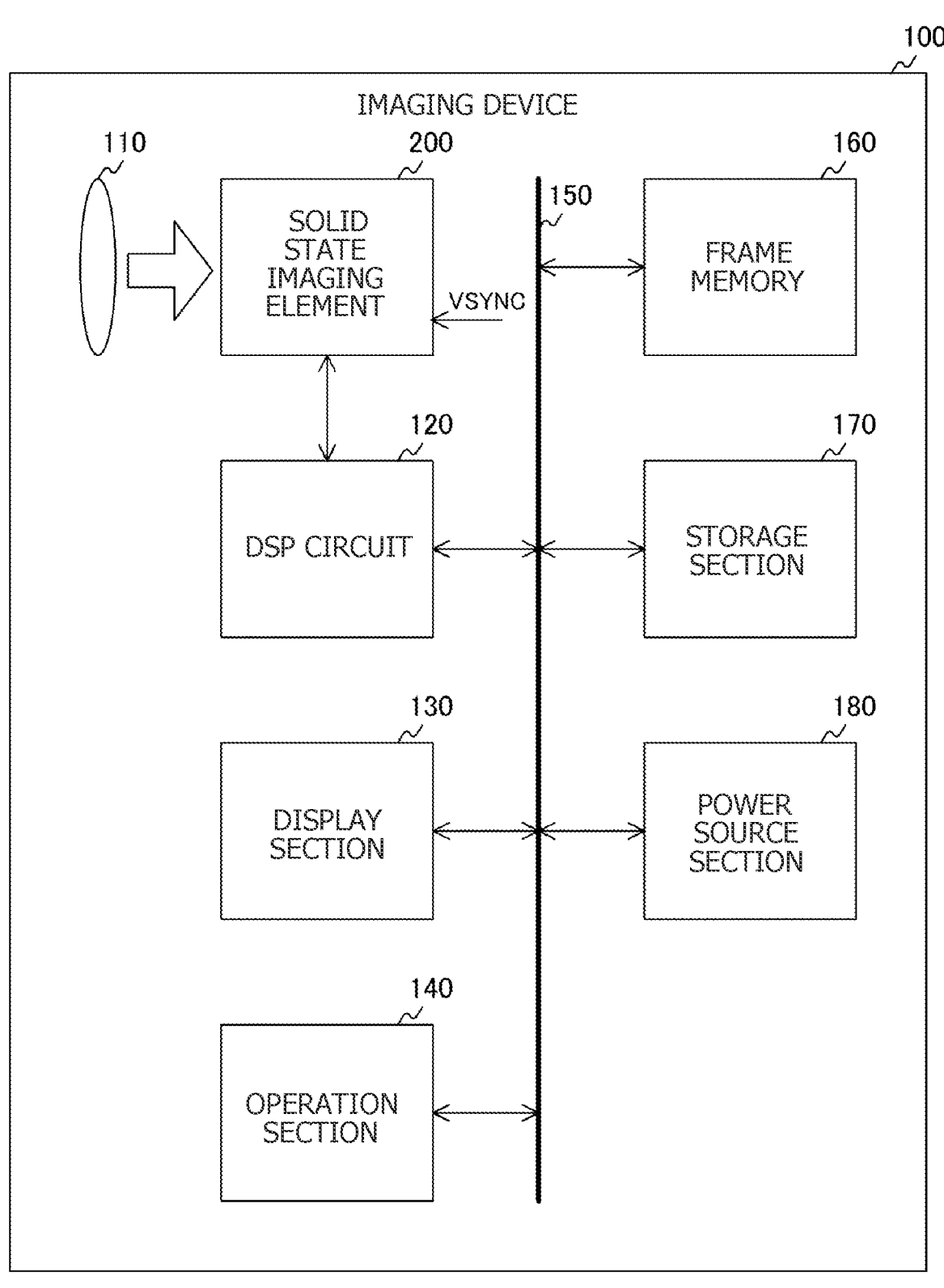
FIG. 30 is a block diagram depicting one configuration example of an imaging device according to a third embodiment of the present technology.

FIG. 30 is a block diagram depicting one configuration example of an imaging device 100 according to the third embodiment of the present technology. The imaging device 100 according to the third embodiment includes an optical section 110, the solid state imaging element 200, and a DSP (Digital Signal Processing) circuit 120. The imaging device 100 further includes a display section 130, an operation section 140, a bus 150, a frame memory 160, a storage section 170, and a power source section 180. For example, in addition to a digital camera such as a digital still camera, a smartphone or personal computer having an imaging function or an on-vehicle camera, for example, is assumed to be adopted as the imaging device 100.

The optical section 110 collects light from a subject, and guides the light to the solid state imaging element 200. The solid state imaging element 200 according to the third embodiment supplies a pair of pixel signals to the DSP circuit 120 without performing extraction of a feature amount or recognition of an image.

The DSP circuit 120 performs predetermined image processing on image data supplied from the solid state imaging element 200. In the feature extraction mode, the DSP circuit 120 performs extraction of a feature amount and recognition of an image on the basis of a pair of pixel signals, generates a mode signal from a result of the recognition, and supplies the mode signal to the solid state imaging element 200. Further, in the normal mode, the DSP circuit 120 performs image processing, and outputs the processed image data to the frame memory 160, etc., via the bus 150. It is to be noted that the DSP circuit 120 is one example of the digital signal processing circuit set forth in the claims.

It is to be noted that this configuration in which the DSP circuit 120 performs extraction of a feature amount and recognition of an image is not limitative. Alternatively, the solid state imaging element 200 may perform extraction of a feature amount while the DSP circuit 120 may perform recognition of an image.

The display section 130 displays image data. For example, a liquid crystal panel or an organic EL (Electro Luminescence) panel is assumed to be adopted as the display section 130. The operation section 140 generates an operation signal according to a user operation.

The bus 150 is a common path for allowing data exchange among the optical section 110, the solid state imaging element 200, the DSP circuit 120, the display section 130, the operation section 140, the frame memory 160, the storage section 170, and the power source section 180.

The frame memory 160 holds image data. The storage section 170 stores a variety of kinds of data including image data. The power source section 180 supplies a power source to the solid state imaging element 200, the DSP circuit 120, and the display section 130.

As depicted in FIG. 30, extraction of a feature amount and recognition of an image are performed by the DSP circuit 120 in place of the solid state imaging element 200. Accordingly, the processing amount in the solid state imaging element 200 can be reduced.

It is to be noted that the second embodiment can be applied to the third embodiment.

As described so far, the DSP circuit 120 performs extraction of a feature amount and recognition of an image in the first embodiment of the present technology. Accordingly, it is not necessary for the solid state imaging element 200 to perform these processes.

4. Fourth Embodiment

In the above-mentioned first embodiment in which the photoelectric conversion element 241 and the floating diffusion layer 244 are disposed for each pixel, miniaturization of pixels is difficult. The solid state imaging element 200 according to the fourth embodiment is different from that of the first embodiment in that the floating diffusion layer 244 is shared by two adjacent pixels.

FIG. 31 is a diagram depicting one configuration example of the pixel array section 230 according to the fourth embodiment of the present technology. In the pixel array section 230, a block consisting of two pixels that are adjacent to each other in a predetermined direction (e.g., the vertical direction) is defined as an FD sharing block 400.

The FD sharing block 400 includes the photoelectric conversion element 241, the transfer transistor 242, the reset transistor 243, the floating diffusion layer 244, the amplification transistor 245, the selection transistor 246, a photoelectric conversion element 401, and a transfer transistor 402.

The connection configuration of the photoelectric conversion element 241, the transfer transistor 242, the reset transistor 243, the floating diffusion layer 244, the amplification transistor 245, and the selection transistor 246 in the fourth embodiment is similar to that in the first embodiment.

The transfer transistor 402 transfers an electric charge from the photoelectric conversion element 401 to the floating diffusion layer 244 according to a transfer signal TRG (for example, TRG1) that is different from that transferred to the transfer transistor 242. With the circuit configuration depicted in FIG. 31, the FD sharing block 400 functions as two pixels sharing the floating diffusion layer 244.

In addition, in the fourth embodiment, one selection line is disposed for each two rows, while two selection lines are disposed for each row in the first embodiment. In addition, since the floating diffusion layer 244 is shared by two adjacent pixels, as depicted in FIG. 31, the number of elements for each pixel can be reduced, compared to a case where the floating diffusion layer is not shared by pixels. Accordingly, miniaturization can easily be achieved.

It is to be noted that the floating diffusion layer 244 is shared by the two pixels that are adjacent to each other in the vertical direction, but the floating diffusion layer 244 may be shared by two pixels that are adjacent to each other in the horizontal direction. In addition, the number of pixels sharing the floating diffusion layer 244 is set to two, but the number of such pixels may be three or more (for example, four pixels or eight pixels).

Figure 32:
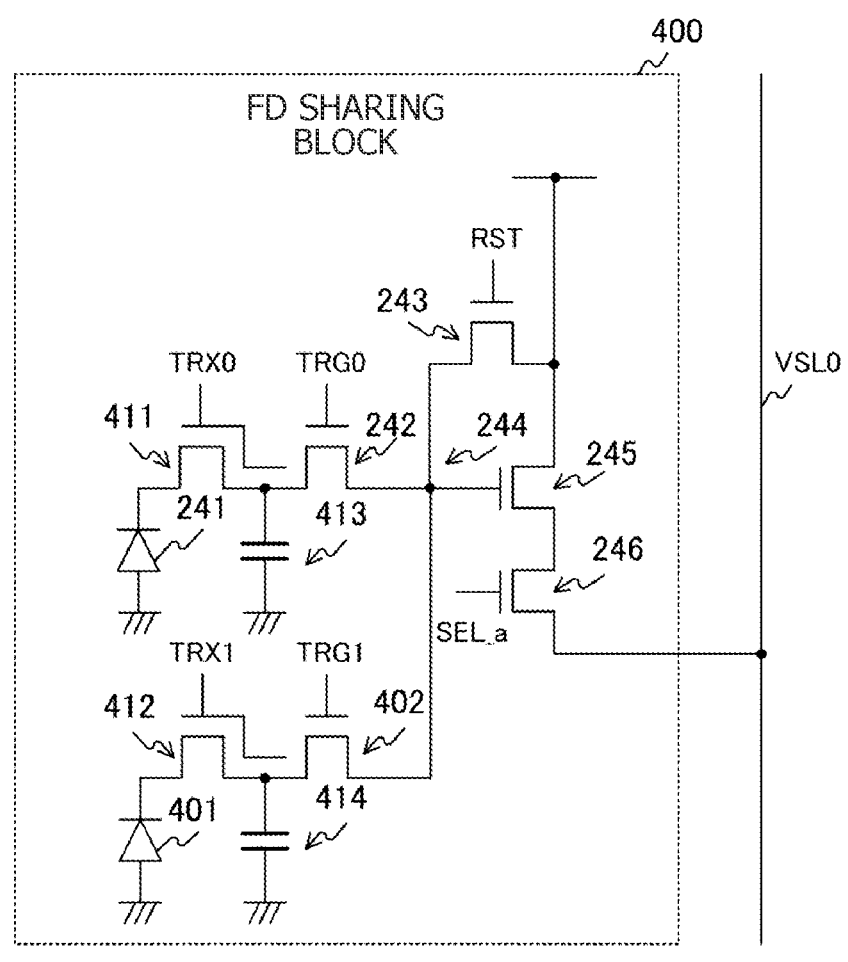
FIG. 32 is a circuit diagram depicting one example of an FD sharing block provided with capacitance elements according to the fourth embodiment of the present technology.

In addition, TRX transistors 411 and 412 and capacitances 413 and 414 may be further added, as depicted in FIG. 32. In this configuration, the TRX transistor 411 transfers an electric charge from the photoelectric conversion element 241 to the capacitance 413 according to a transfer signal TRX0. In addition, the transfer transistor 412 transfers an electric charge from the photoelectric conversion element 241 to the capacitance 414 according to a transfer signal TRX1.

In addition, the transfer transistor 242 transfers an electric charge from the capacitance 413 to the floating diffusion layer 244 according to a transfer signal TRG0, and the transfer transistor 242 transfers an electric charge from the capacitance 414 to the floating diffusion layer 244 according to a transfer signal TRG1. With the circuit configuration in FIG. 32, global shutter exposure can be performed. The circuit control method in FIG. 32 is disclosed in FIG. 8 of PCT Patent Publication No. WO2018/066348, for example.

Figure 33:
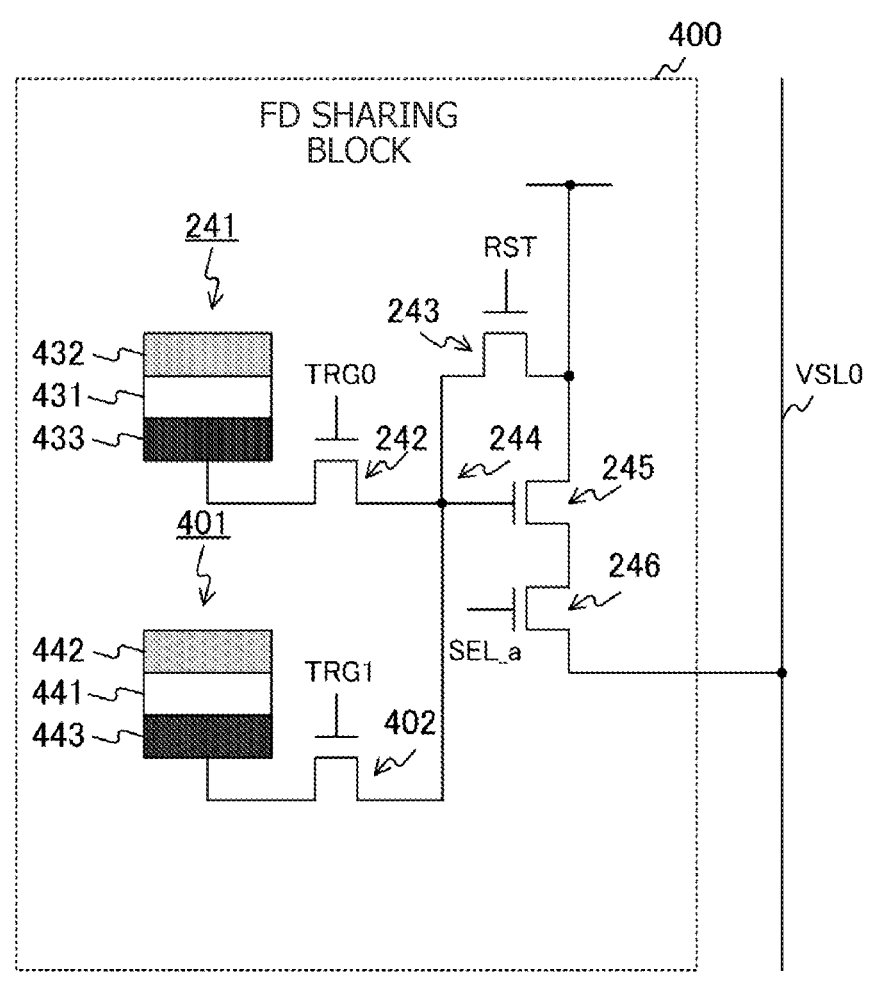
FIG. 33 is a circuit diagram depicting one example of an FD sharing block provided with photoelectric conversion films according to the fourth embodiment of the present technology.

Alternatively, a photoelectric conversion film (an organic photoelectric conversion film or an inorganic photoelectric conversion film) may be used, as depicted in FIG. 33. In this case, the photoelectric conversion element 241 includes a transparent electrode 432, a photoelectric conversion film 431, and a lower electrode 433. The photoelectric conversion element 401 includes a transparent electrode 442, a photoelectric conversion film 441, and a lower electrode 443. The circuit control method in FIG. 33 is disclosed in FIG. 11 of PCT Patent Publication No. WO2018/066348, for example.

It is to be noted that the second or third embodiment may be applied to the fourth embodiment.

As explained so far, the floating diffusion layer 244 is shared by two pixels in the fourth embodiment of the present technology. Accordingly, the number of elements for each pixel can be reduced, compared to a case where the floating diffusion layer 244 is not shared by pixels.

5. Fifth Embodiment

In the above-mentioned first embodiment in which the resolution is fixed in the feature extraction mode, there is a concern that the accuracy of image recognition may be insufficient. The solid state imaging element 200 according to the fifth embodiment is different from that of the first embodiment in that a resolution in a partial region is changed on the basis of a result of image recognition.

FIG. 34 is a diagram depicting one example of a frame according to the fifth embodiment of the present technology. In FIG. 34, "a" is a diagram depicting one example of a frame before a ROI (Region of Interest) is defined in the feature extraction mode. In FIG. 34, "b" is a diagram depicting one example of a frame before the resolution of the ROI is changed. In FIG. 34, "c" is a diagram depicting one example of a frame after the resolution of the ROI is changed.

In the feature extraction mode, the solid state imaging element 200 reads out two pixel signal pairs from each unit area, and generates a first frame 501, as depicted in "a" of FIG. 34. The solid state imaging element 200 determines the presence/absence of a predetermined object by performing image recognition. It is assumed that an object to be detected is not included in the first frame 501. In this case, the ROI is not defined.

Next, the solid state imaging element 200 reads out pixel signals in the same reading pattern as that used in the first frame, and generates a second frame 502, as depicted in "b" of FIG. 34. It is assumed that an object to be detected is included in the frame 502. In this case, the signal processing circuit 280 of the solid state imaging element 200 defines, as the ROI, a predetermined region including the object. In "b" of FIG. 34, a region surrounded by a dotted line is one example of the ROI.

Then, the vertical scanning circuit 210 of the solid state imaging element 200 sets the resolution of the ROI to be higher than that in the previous frame 502. The resolution of a non-ROI region remains unchanged. Subsequently, the solid state imaging element 200 generates a frame 503, as depicted in "c" of FIG. 34. The solid state imaging element 200 performs image recognition again on the frame 503.

As depicted in FIG. 34, the vertical scanning circuit 210 changes the resolution of the ROI on the basis of a result of detection regarding the presence/absence of an object. Accordingly, the accuracy of object recognition can be improved, compared to a case where the resolution is fixed.

FIG. 35 is a diagram depicting one example of a ROI before and after a resolution change according to the fifth embodiment of the present technology. In FIG. 35, "a" is a diagram depicting one example of the ROI whose resolution has not yet been increased, and "b" is a diagram depicting one example of the ROI whose resolution has been increased.

As depicted in "a" of FIG. 35, 16 pixels are read out from 8 rows×8 columns before the resolution is changed. On the other hand, as depicted in "b" of FIG. 35, 20 pixels are read out from 8 rows×8 columns after the resolution is changed.

It is to be noted that the vertical scanning circuit 210 can also change, in addition to the resolution, a reading pattern in each unit area. For example, the vertical scanning circuit 210 can read out a pair of pixels of the same color before the change, and read out a pair of pixels of different colors after the change. Alternatively, the vertical scanning circuit 210 may shift an access position within a unit area.

Figure 36:
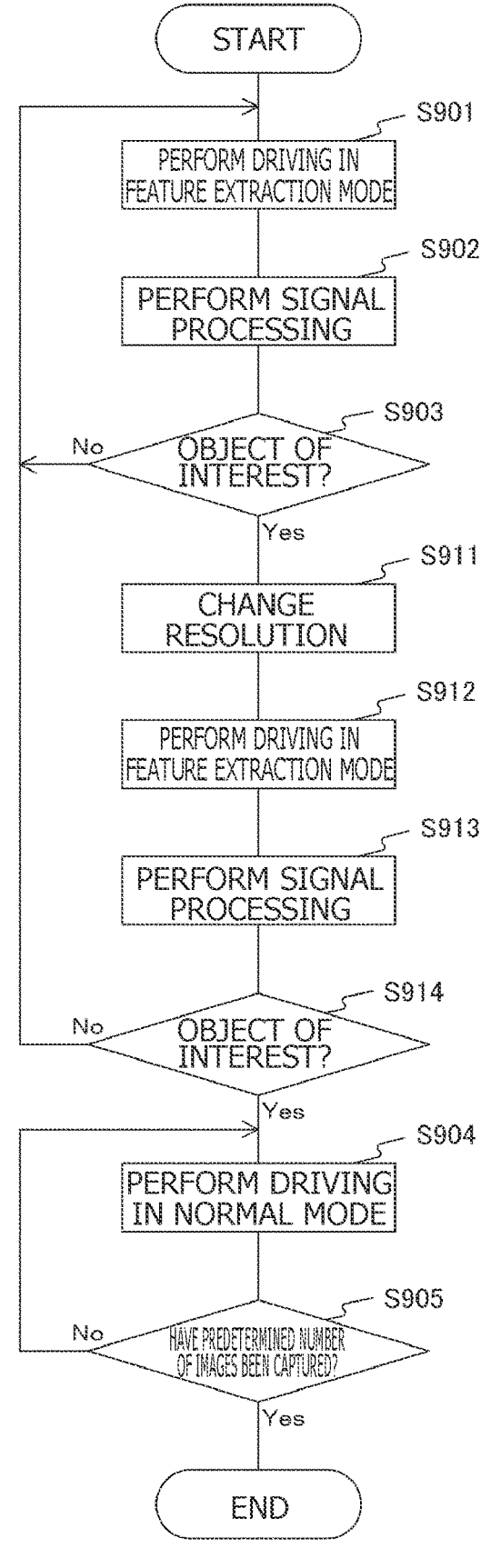
FIG. 36 is a flowchart of one example of operation of a solid state imaging element according to the fifth embodiment of the present technology.

FIG. 36 is a flowchart of one example of operation of the solid state imaging element 200 according to the fifth embodiment of the present technology. The solid state imaging element 200 executes steps S901 to S903. In a case where the subject is not an object of interest (No in step S903), the solid state imaging element 200 repeats step S901 and the subsequent steps.

On the other hand, in a case where the subject is an object of interest (Yes in step S903), the vertical scanning circuit 210 defines, as a ROI, a predetermined region including the object of interest, and changes the resolution of the ROI (step S911). Further, the vertical scanning circuit 210 is driven in the feature extraction mode, and generates a frame in which the resolution of the ROI has been increased (step S912). The signal processing circuit 280 performs signal processing such as image recognition (step S913). It is to be noted that, in addition, the object of interest can be analyzed in detail in the signal processing in step S913.

The signal processing circuit 280 determines whether or not a subject in the ROI is an object of interest, on the basis of a result of the image recognition (step S914). In a case where the subject is not an object of interest (No in step S914), the solid state imaging element 200 repeats step S901 and the subsequent steps.

On the other hand, in a case where the subject is an object of interest (Yes in step S914), the vertical scanning circuit 210 executes steps S904 and S905. It is to be noted that the operation may be exited without executing steps S904 and S905. In addition, in a case where the subject is an object of interest (Yes in step S914), the vertical scanning circuit 210 may start step S904 after the elapse of a fixed time with a timer.

It is to be noted that the second, third, or fourth embodiment can be applied to the fifth embodiment.

As explained so far, the vertical scanning circuit 210 changes the resolution of the ROI on the basis of a result of detection regarding the presence/absence of an object in the fifth embodiment of the present technology. Accordingly, the accuracy of object recognition can be improved.

6. Examples of Applications to Mobile Bodies

The technology according to the present disclosure (present technology) can be applied to various products. For example, the technology according to the present disclosure may be implemented as a device mounted in any type of mobile bodies such as an automobile, an electric automobile, a hybrid electric automobile, a motor cycle, a bicycle, a personal transporter, an airplane, a drone, a ship, or a robot.

FIG. 37 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 37, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 37, an audio speaker 12061, a display section 12062, and an instrument panel 12063 are illustrated as the output device. The display section 12062 may, for example, include at least one of an on-board display and a head-up display.

Figure 38:
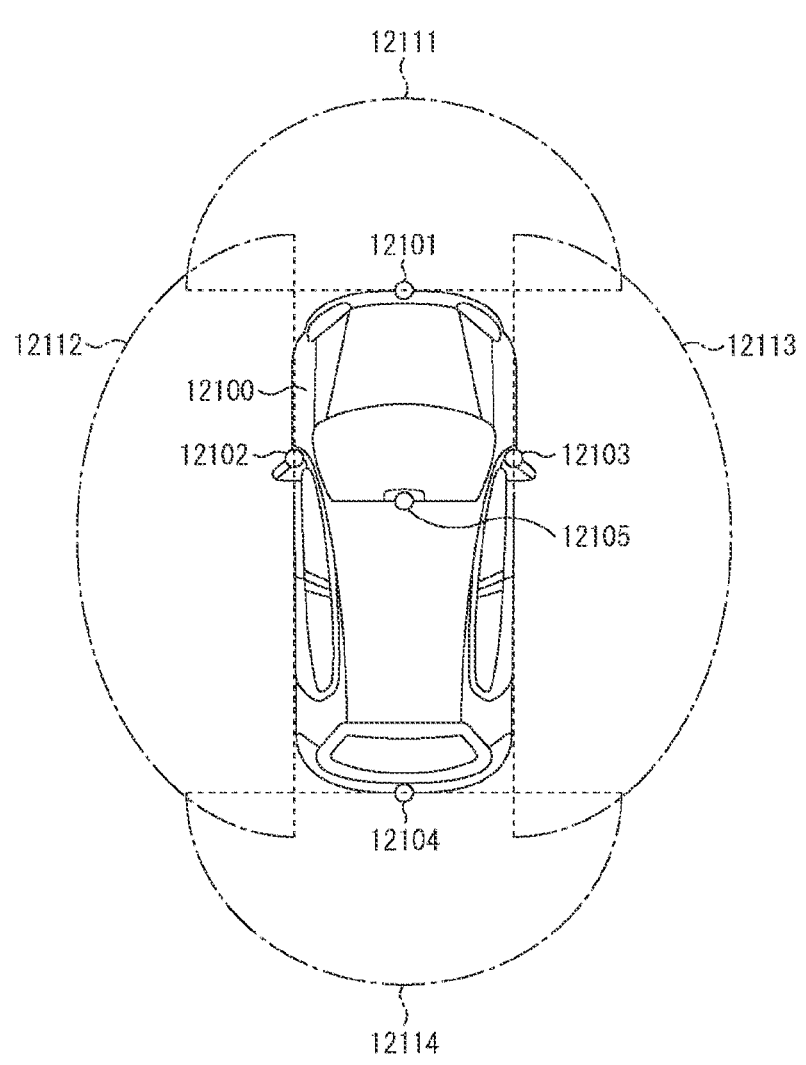
FIG. 38 is a diagram of assistance in explaining an example of installation positions of an outside-vehicle information detecting section and an imaging section.

FIG. 38 is a diagram depicting an example of the installation position of the imaging section 12031.

In FIG. 38, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 38 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

One example of the vehicle control system to which the technology according to the present disclosure is applicable has been explained above. The technology according to the present disclosure is applicable to the imaging section 12031 of the above-mentioned configuration, for example. Specifically, the solid state imaging element 200 in FIG. 1 is applicable to the imaging section 12031. When the technology according to the present disclosure is applied to the imaging section 12031, kTC noise during sampling can be suppressed, and an easily viewable photographic image can be obtained. Accordingly, fatigue of a driver can be lessened.

It is to be noted that the above-mentioned embodiments are examples for embodying the present technology, and there are correspondences between the matters in the embodiments and the invention-specifying matters in the claims. Also, there are correspondences between the invention-specifying matters in the claims and the matters given the same names in the embodiments of the present technology. However, the present technology is not limited to the embodiments, and various modifications can be made within the scope of the gist of the present technology to embody the present technology.

It is to be noted that the effects described in the present description are just examples, and thus, are not limited. In addition, any other effect may be provided.

It is to be noted that the present technology can also adopt the following configurations.

(1)

A solid state imaging element including:

a pixel array section on which a plurality of pixels are arranged in directions of rows and directions of columns;

a vertical scanning circuit that selects, from among the plurality of pixels, a pair of pixels disposed on both ends of a predetermined line segment which does not match any of the rows and the columns and which forms an angle of not 45 degrees with respect to the rows and that causes the selected pixels to simultaneously output a pair of pixel signals; and a signal processing circuit that performs predetermined signal processing on the pair of pixel signals.

(2)

The solid state imaging element according to (1) above, in which a predetermined number of unit areas are arranged on the pixel array section, and the vertical scanning circuit selects the pair of pixels in each of the unit areas.

(3)

The solid state imaging element according to (2) above, in which the pixel array section is sectioned into the predetermined number of unit areas.

(4)

The solid state imaging element according to (2) or (3) above, in which the predetermined number of unit areas include a first unit area and a second unit area that are adjacent to each other, the vertical scanning circuit selects a predetermined number of first pixels in the first unit area, and selects a predetermined number of second pixels in the second unit area, and a pattern of the second pixels is linearly symmetric with a pattern of the first pixels.

26

(5)

The solid state imaging element according to (2) above, in which the predetermined number of unit areas include a first unit area and a second unit area that are adjacent to each other, and the first unit area and the second unit area partially overlap with each other.

(6)

The solid state imaging element according to any one of (2) to (5) above, in which 4 rows×4 columns=16 pixels are arranged in each of the unit areas.

(7)

The solid state imaging element according to (6) above, in which the vertical scanning circuit selects two pairs of pixels in each of the unit areas, the pixels of the two pairs are disposed in different rows, and the pixels of the two pairs are disposed in different columns.

(8)

The solid state imaging element according to any one of (1) to (7) above, in which the vertical scanning circuit selects a pair of pixels that receive light of the same color.

(9)

The solid state imaging element according to any one of (1) to (7) above, in which the vertical scanning circuit selects a pair of pixels that receive light of different colors.

(10)

The solid state imaging element according to any one of (1) to (9) above, in which the plurality of pixels are arranged in a Bayer layout.

(11)

The solid state imaging element according to any one of (1) to (9) above, in which the plurality of pixels include a pixel that receives infrared light.

(12)

The solid state imaging element according to any one of (1) to (9) above, in which the plurality of pixels are arranged in a quad Bayer layout.

(13)

The solid state imaging element according to any one of (1) to (12) above, in which each of the plurality of pixels has a diamond shape having a predetermined diagonal line in parallel with the rows.

(14)

The solid state imaging element according to any one of (1) to (13) above, in which the signal processing circuit includes a level control circuit that amplifies or attenuates a signal level of one of the pair of pixel signals by a predetermined gain, a comparison circuit that compares the pair of pixel signals after the signal level of one of the pair is amplified or attenuated and that outputs a result of the comparison, and an edge determination circuit that determines presence/absence of an edge on the basis of the result of the comparison.

(15)

The solid state imaging element according to any one of (1) to (14) above, in which, among the plurality of pixels, a predetermined number of adjacent pixels share a floating diffusion layer.

(16)

The solid state imaging element according to any one of (1) to (15) above, in which the signal processing involves a process of extracting a predetermined feature amount from the pair of pixel signals and an image recognition process of determining presence/absence of a predetermined object on the basis of the feature amount and outputting a result of the determination.

(17)

The solid state imaging element according to (16) above, in which the vertical scanning circuit changes a resolution of a predetermined region on the basis of the result of the determination.

(18)

The solid state imaging element according to (1) above, in which the signal processing involves a process of generating addition data by adding the pair of pixel signals, a process of extracting a predetermined feature amount from the addition data, and an image recognition process of determining presence/absence of a predetermined object on the basis of the feature amount and outputting a result of the determination.

(19)

An imaging device including:

a solid state imaging element including a pixel array section on which a plurality of pixels are arranged in directions of rows and directions of columns and a vertical scanning circuit that selects, from among the plurality of pixels, a pair of pixels disposed on both ends of a predetermined line segment which does not match any of the rows and the columns and which forms an angle of not 45 degrees with respect to the rows and that causes the selected pixels to simultaneously output a pair of pixel signals; and a digital signal processing circuit that performs predetermined signal processing on the basis of the pair of pixel signals.

(20)

A solid state imaging element control method including:

a vertical scanning step of selecting, from among a plurality of pixels arranged in directions of rows and directions of columns on a pixel array section, a pair of pixels that are disposed on both ends of a predetermined line segment which does not match any of the rows and the columns on the pixel array section and which forms an angle of not 45 degrees with respect to the rows, and causing the selected pixels to simultaneously output a pair of pixel signals; and a signal processing step of performing predetermined signal processing on the pair of pixel signals.

REFERENCE SIGNS LIST

100: Imaging device
110: Optical section
120: DSP circuit
130: Display section
140: Operation section
150: Bus 160: Frame memory
170: Storage section
180: Power source section
200: Solid state imaging element
210: Vertical scanning circuit
220: Control section
230: Pixel array section
235: Load MOS circuit
240: Pixel
241, 401: Photoelectric conversion element
242, 402: Transfer transistor
243: Reset transistor
244: Floating diffusion layer
245: Amplification transistor
246: Selection transistor
250: AD conversion section
260: Horizontal scanning section
270: Memory
280: Signal processing circuit
281: Digital signal processing section
282: Feature extraction section
283: Image recognition section
285: Post-stage signal processing circuit
290: Input/output section
300: Preceding-stage signal processing circuit
320: Selection section
321 to 324: Selector
330, 331: Edge detection section
350: Level control circuit
351, 352: Gain circuit
360, 371 to 373: Source follower circuit
374 to 377: Variable capacitance
381: Comparison circuit
382, 383: Comparator
384: Edge determination circuit
400: FD sharing block
411, 412: TRX transistor
413, 414: Capacitance
431, 441: Photoelectric conversion film
432, 442: Transparent electrode
433, 443: Lower electrode
12031: Imaging section

What is claimed is:

1. A solid state imaging element, comprising:

a pixel array section on which a plurality of pixels are arranged in directions of rows and directions of columns;

a vertical scanning circuit that selects, from among the plurality of pixels, a pair of pixels disposed on both ends of a predetermined line segment which does not match any of the rows and the columns and which forms an angle of not 45 degrees with respect to the rows and that causes the selected pixels to simultaneously output a pair of pixel signals; and a signal processing circuit that performs predetermined signal processing on the pair of pixel signals, wherein a predetermined number of unit areas are arranged on the pixel array section, wherein the vertical scanning circuit selects the pair of pixels in each of the unit areas, wherein the predetermined number of unit areas include a first unit area and a second unit area that are adjacent to each other, and wherein the first unit area and the second unit area partially overlap with each other.

2. The solid state imaging element according to claim 1, wherein the vertical scanning circuit selects a pair of pixels that receive light of a same color.

3. The solid state imaging element according to claim 1, wherein the vertical scanning circuit selects a pair of pixels that receive light of different colors.

4. The solid state imaging element according to claim 1, wherein the plurality of pixels are arranged in a Bayer layout.

5. The solid state imaging element according to claim 1, wherein the plurality of pixels include a pixel that receives infrared light.

6. The solid state imaging element according to claim 1, wherein each of the plurality of pixels has a diamond shape having a predetermined diagonal line in parallel with the rows.

7. The solid state imaging element according to claim 1, wherein the signal processing circuit includes a level control circuit that amplifies or attenuates a signal level of one of the pair of pixel signals by a predetermined gain, a comparison circuit that compares the pair of pixel signals after the signal level of one of the pair is amplified or attenuated and that outputs a result of the comparison, and an edge determination circuit that determines presence/absence of an edge on a basis of the result of the comparison.

8. The solid state imaging element according to claim 1, wherein, among the plurality of pixels, a predetermined number of adjacent pixels share a floating diffusion layer.

9. The solid state imaging element according to claim 1, wherein the signal processing involves a process of:

extracting a predetermined feature amount from the pair of pixel signals;

an image recognition process of determining presence/absence of a predetermined object on a basis of the feature amount; and outputting a result of the determination.

10. The solid state imaging element according to claim 9, wherein the vertical scanning circuit changes a resolution of a predetermined region on a basis of the result of the determination.

11. The solid state imaging element according to claim 1, wherein the signal processing involves:

a process of generating addition data by adding the pair of pixel signals;

a process of extracting a predetermined feature amount from the addition data;

an image recognition process of determining presence/absence of a predetermined object on a basis of the feature amount; and outputting a result of the determination.

12. A solid state imaging element, comprising:

a pixel array section on which a plurality of pixels are arranged in directions of rows and directions of columns;

a vertical scanning circuit that selects, from among the plurality of pixels, a pair of pixels disposed on both ends of a predetermined line segment which does not match any of the rows and the columns and which forms an angle of not 45 degrees with respect to the rows and that causes the selected pixels to simultaneously output a pair of pixel signals; and a signal processing circuit that performs predetermined signal processing on the pair of pixel signals, wherein a predetermined number of unit areas are arranged on the pixel array section, wherein the vertical scanning circuit selects the pair of pixels in each of the unit areas, and wherein 4 rows×4 columns=16 pixels are arranged in each of the unit areas.

13. The solid state imaging element according to claim 12, wherein the vertical scanning circuit selects two pairs of pixels in each of the unit areas, wherein the pixels of the two pairs are disposed in different rows, and wherein the pixels of the two pairs are disposed in different columns.

14. The solid state imaging element according to claim 12, wherein the vertical scanning circuit selects a pair of pixels that receive light of a same color.

15. The solid state imaging element according to claim 12, wherein the vertical scanning circuit selects a pair of pixels that receive light of different colors.

16. A solid state imaging element, comprising:

a pixel array section on which a plurality of pixels are arranged in directions of rows and directions of columns;

a vertical scanning circuit that selects, from among the plurality of pixels, a pair of pixels disposed on both ends of a predetermined line segment which does not match any of the rows and the columns and which forms an angle of not 45 degrees with respect to the rows and that causes the selected pixels to simultaneously output a pair of pixel signals; and a signal processing circuit that performs predetermined signal processing on the pair of pixel signals, wherein the plurality of pixels are arranged in a quad Bayer layout.

17. The solid state imaging element according to claim 16, wherein-a predetermined number of unit areas are arranged on the pixel array section, and wherein the vertical scanning circuit selects the pair of pixels in each of the unit areas.

18. The solid state imaging element according to claim 17, wherein the pixel array section is sectioned into the predetermined number of unit areas.

19. The solid state imaging element according to claim 17, wherein-the predetermined number of unit areas include a first unit area and a second unit area that are adjacent to each other, wherein the vertical scanning circuit selects a predetermined number of first pixels in the first unit area, and selects a predetermined number of second pixels in the second unit area, and wherein a pattern of the second pixels is linearly symmetric with a pattern of the first pixels.

20. The solid state imaging element according to claim 17, wherein-the predetermined number of unit areas include a first unit area and a second unit area that are adjacent to each other, and wherein the first unit area and the second unit area partially overlap with each other.

* * * * *